United States Patent
Kyles et al.

(10) Patent No.: US 9,374,154 B2
(45) Date of Patent: *Jun. 21, 2016

(54) WIRELESS CONNECTIONS WITH VIRTUAL HYSTERESIS

(71) Applicant: Keyssa, Inc., Mountain View, CA (US)

(72) Inventors: Ian A. Kyles, West Linn, OR (US); Gary D. McCormack, Tigard, OR (US); Norbert Seitz, Portland, OR (US)

(73) Assignee: Keyssa, Inc., Campbell, CA (US)

( * ) Notice: Subject to any disclaimer, the term of this patent is extended or adjusted under 35 U.S.C. 154(b) by 5 days.

This patent is subject to a terminal disclaimer.

(21) Appl. No.: 14/026,913

(22) Filed: Sep. 13, 2013

(65) Prior Publication Data

US 2014/0080417 A1 Mar. 20, 2014

Related U.S. Application Data

(60) Provisional application No. 61/701,310, filed on Sep. 14, 2012.

(51) Int. Cl.
| | |
|---|---|
| *H04B 7/08* | (2006.01) |
| *H04B 5/00* | (2006.01) |
| *H04W 52/02* | (2009.01) |
| *H04B 7/24* | (2006.01) |
| *H04B 5/02* | (2006.01) |
| *H04B 17/318* | (2015.01) |

(52) U.S. Cl.
CPC .. *H04B 7/24* (2013.01); *H04B 5/02* (2013.01); *H04B 17/318* (2015.01)

(58) Field of Classification Search
CPC .. H04B 7/0857; H04B 17/318; H04B 5/0043; H04W 52/0245; H04W 52/245; H04W 24/06
See application file for complete search history.

(56) References Cited

U.S. PATENT DOCUMENTS

| | | |
|---|---|---|
| 2,753,551 A | 7/1956 | Richmond |
| 3,796,831 A | 3/1974 | Bauer |

(Continued)

FOREIGN PATENT DOCUMENTS

| | | |
|---|---|---|
| CN | 2237914 Y | 10/1996 |
| CN | 1178402 A | 4/1998 |

(Continued)

OTHER PUBLICATIONS

L. L. Goldstone, "MM Wave Transmission Polarizer", International Symposium Digest—Antennas & Propagation vol. 2, Jun. 1979, 5 pages.

(Continued)

*Primary Examiner* — Andrew Wendell
(74) *Attorney, Agent, or Firm* — Fenwick & West LLP

(57) ABSTRACT

Circuit connectors for establishing EHF communication include a receiver configured to receive a transmitted EHF electromagnetic signal, and an output circuit coupled to the receiver. The output circuit has two states of operation that correspond to enabling a signal output and disabling the signal output. The output circuit is also configured to change its state of operation responsive to a state of a control signal, and a controller is coupled to the receiver and configured to produce the control signal. The control signal has two states that correspond to a first condition when the received signal exceeds a first threshold and a second condition when the received signal is less than a second threshold.

21 Claims, 10 Drawing Sheets

(56) References Cited

U.S. PATENT DOCUMENTS

| | | |
|---|---|---|
| 3,971,930 A | 7/1976 | Fitzmaurice et al. |
| 3,987,365 A | 10/1976 | Okada et al. |
| 4,293,833 A | 10/1981 | Popa |
| 4,485,312 A | 11/1984 | Kusakabe et al. |
| 4,497,068 A | 1/1985 | Fischer |
| 4,525,693 A | 6/1985 | Suzuki et al. |
| 4,694,504 A | 9/1987 | Porter et al. |
| 4,771,294 A | 9/1988 | Wasilousky |
| 4,800,350 A | 1/1989 | Bridges et al. |
| 4,875,026 A | 10/1989 | Walter et al. |
| 4,946,237 A | 8/1990 | Arroyo et al. |
| 5,164,942 A | 11/1992 | Kamerman et al. |
| 5,199,086 A | 3/1993 | Johnson et al. |
| 5,471,668 A | 11/1995 | Soenen et al. |
| 5,543,808 A | 8/1996 | Feigenbaum et al. |
| 5,621,913 A | 4/1997 | Tuttle et al. |
| 5,749,052 A | 5/1998 | Hidem et al. |
| 5,754,948 A | 5/1998 | Metze |
| 5,773,878 A | 6/1998 | Lim et al. |
| 5,786,626 A | 7/1998 | Brady et al. |
| 5,861,782 A | 1/1999 | Saitoh |
| 5,921,783 A | 7/1999 | Fritsch et al. |
| 5,941,729 A | 8/1999 | Sri-Jayantha |
| 5,943,374 A | 8/1999 | Kokuryo et al. |
| 5,956,626 A | 9/1999 | Kaschke et al. |
| 6,011,785 A | 1/2000 | Carney |
| 6,072,433 A | 6/2000 | Young et al. |
| 6,252,767 B1 | 6/2001 | Carlson |
| 6,351,237 B1 | 2/2002 | Martek et al. |
| 6,373,447 B1 | 4/2002 | Rostoker et al. |
| 6,490,443 B1 | 12/2002 | Freeny, Jr. |
| 6,492,973 B1 | 12/2002 | Kuroki et al. |
| 6,534,784 B2 | 3/2003 | Eliasson et al. |
| 6,542,720 B1 | 4/2003 | Tandy |
| 6,590,544 B1 | 7/2003 | Filipovic |
| 6,607,136 B1 | 8/2003 | Atsmon et al. |
| 6,647,246 B1 | 11/2003 | Lu |
| 6,718,163 B2 | 4/2004 | Tandy |
| 6,768,770 B1 | 7/2004 | Lipperer |
| 6,803,841 B2 | 10/2004 | Saitoh et al. |
| 6,915,529 B1 | 7/2005 | Suematsu et al. |
| 6,967,347 B2 | 11/2005 | Estes et al. |
| 7,050,763 B2 | 5/2006 | Stengel et al. |
| 7,107,019 B2 | 9/2006 | Tandy |
| 7,113,087 B1 | 9/2006 | Casebolt et al. |
| 7,213,766 B2 | 5/2007 | Ryan et al. |
| 7,311,526 B2 | 12/2007 | Rohrbach et al. |
| 7,512,395 B2 | 3/2009 | Beukema et al. |
| 7,517,222 B2 | 4/2009 | Rohrbach et al. |
| 7,593,708 B2 | 9/2009 | Tandy |
| 7,598,923 B2 | 10/2009 | Hardacker et al. |
| 7,599,427 B2 | 10/2009 | Bik |
| 7,612,630 B2 | 11/2009 | Miller |
| 7,617,342 B2 | 11/2009 | Rofougaran |
| 7,645,143 B2 | 1/2010 | Rohrbach et al. |
| 7,656,205 B2 | 2/2010 | Chen et al. |
| 7,664,461 B2 | 2/2010 | Rofougaran et al. |
| 7,760,045 B2 | 7/2010 | Kawasaki |
| 7,761,092 B2 | 7/2010 | Desch et al. |
| 7,768,457 B2 | 8/2010 | Pettus et al. |
| 7,769,347 B2 | 8/2010 | Louberg et al. |
| 7,778,621 B2 | 8/2010 | Tandy |
| 7,791,167 B1 | 9/2010 | Rofougaran |
| 7,820,990 B2 | 10/2010 | Schroeder et al. |
| 7,881,675 B1 | 2/2011 | Gazdzinski |
| 7,881,753 B2 | 2/2011 | Rofougaran |
| 7,889,022 B2 | 2/2011 | Miller |
| 7,907,924 B2 | 3/2011 | Kawasaki |
| 7,929,474 B2 | 4/2011 | Pettus et al. |
| 7,975,079 B2 | 7/2011 | Bennett et al. |
| 8,013,610 B1 | 9/2011 | Merewether et al. |
| 8,014,416 B2 | 9/2011 | Ho et al. |
| 8,023,886 B2 | 9/2011 | Rofougaran |
| 8,036,629 B2 | 10/2011 | Tandy |
| 8,041,227 B2 | 10/2011 | Holcombe et al. |
| 8,063,769 B2 | 11/2011 | Rofougaran |
| 8,081,699 B2 | 12/2011 | Siwiak et al. |
| 8,087,939 B2 | 1/2012 | Rohrbach et al. |
| 8,121,542 B2 | 2/2012 | Zack et al. |
| 8,131,645 B2 | 3/2012 | Lin et al. |
| 8,183,935 B2 | 5/2012 | Milano et al. |
| 8,244,175 B2 | 8/2012 | Rofougaran |
| 8,244,179 B2 | 8/2012 | Dua |
| 8,279,611 B2 | 10/2012 | Wong et al. |
| 8,339,258 B2 | 12/2012 | Rofougaran |
| 8,346,847 B2 | 1/2013 | Steakley |
| 8,422,482 B2 | 4/2013 | Sugita |
| 8,554,136 B2 | 10/2013 | McCormack |
| 8,634,767 B2 | 1/2014 | Rofougaran et al. |
| 8,755,849 B2 * | 6/2014 | Rofougaran et al. ......... 455/574 |
| 8,794,980 B2 | 8/2014 | McCormack |
| 8,939,773 B2 | 1/2015 | McCormack |
| 2002/0008665 A1 | 1/2002 | Takenoshita |
| 2002/0027481 A1 | 3/2002 | Fiedziuszko |
| 2002/0058484 A1 | 5/2002 | Bobier et al. |
| 2002/0106041 A1 | 8/2002 | Chang et al. |
| 2002/0118083 A1 | 8/2002 | Pergande |
| 2002/0140584 A1 | 10/2002 | Maeda et al. |
| 2003/0025626 A1 | 2/2003 | McEwan |
| 2003/0088404 A1 | 5/2003 | Koyanagi |
| 2003/0137371 A1 | 7/2003 | Saitoh et al. |
| 2004/0043734 A1 | 3/2004 | Hashidate |
| 2004/0160294 A1 | 8/2004 | Elco |
| 2004/0214621 A1 | 10/2004 | Ponce De Leon et al. |
| 2005/0032474 A1 | 2/2005 | Gordon |
| 2005/0099242 A1 | 5/2005 | Sano |
| 2005/0109841 A1 | 5/2005 | Ryan et al. |
| 2005/0124307 A1 | 6/2005 | Ammar |
| 2005/0140436 A1 | 6/2005 | Ichitsubo et al. |
| 2006/0003710 A1 | 1/2006 | Nakagawa et al. |
| 2006/0029229 A1 | 2/2006 | Trifonov et al. |
| 2006/0038168 A1 | 2/2006 | Estes et al. |
| 2006/0051981 A1 | 3/2006 | Neidlein et al. |
| 2006/0077043 A1 * | 4/2006 | Amtmann et al. ......... 340/10.32 |
| 2006/0082518 A1 | 4/2006 | Ram |
| 2006/0128372 A1 | 6/2006 | Gazzola |
| 2006/0140305 A1 | 6/2006 | Netsell et al. |
| 2006/0159158 A1 | 7/2006 | Moore et al. |
| 2006/0258289 A1 | 11/2006 | Dua |
| 2006/0276157 A1 | 12/2006 | Chen et al. |
| 2007/0010295 A1 | 1/2007 | Greene |
| 2007/0024504 A1 | 2/2007 | Matsunaga |
| 2007/0035917 A1 | 2/2007 | Hotelling et al. |
| 2007/0063056 A1 | 3/2007 | Gaucher et al. |
| 2007/0147425 A1 | 6/2007 | Lamoureux et al. |
| 2007/0229270 A1 | 10/2007 | Rofougaran |
| 2007/0242621 A1 | 10/2007 | Nandagopalan et al. |
| 2007/0273476 A1 | 11/2007 | Yamazaki et al. |
| 2007/0278632 A1 | 12/2007 | Zhao et al. |
| 2008/0002652 A1 | 1/2008 | Gupta et al. |
| 2008/0055093 A1 | 3/2008 | Shkolnikov et al. |
| 2008/0055303 A1 | 3/2008 | Ikeda |
| 2008/0089667 A1 | 4/2008 | Grady et al. |
| 2008/0112101 A1 | 5/2008 | McElwee et al. |
| 2008/0142250 A1 | 6/2008 | Tang |
| 2008/0143435 A1 | 6/2008 | Wilson et al. |
| 2008/0150799 A1 | 6/2008 | Hemmi et al. |
| 2008/0150821 A1 | 6/2008 | Koch et al. |
| 2008/0159243 A1 | 7/2008 | Rofougaran |
| 2008/0165002 A1 | 7/2008 | Tsuji |
| 2008/0165065 A1 | 7/2008 | Hill et al. |
| 2008/0192726 A1 | 8/2008 | Mahesh et al. |
| 2008/0195788 A1 | 8/2008 | Tamir et al. |
| 2008/0197973 A1 | 8/2008 | Enguent |
| 2008/0238632 A1 | 10/2008 | Endo et al. |
| 2008/0289426 A1 | 11/2008 | Kearns et al. |
| 2008/0290959 A1 | 11/2008 | Ali et al. |
| 2008/0293446 A1 | 11/2008 | Rofougaran |
| 2009/0006677 A1 | 1/2009 | Rofougaran |
| 2009/0009337 A1 | 1/2009 | Rofougaran |
| 2009/0015353 A1 | 1/2009 | Rofougaran |
| 2009/0028177 A1 | 1/2009 | Pettus et al. |
| 2009/0029659 A1 | 1/2009 | Gonzalez |
| 2009/0033455 A1 | 2/2009 | Strat et al. |

(56) References Cited

U.S. PATENT DOCUMENTS

| | | |
|---|---|---|
| 2009/0037628 A1 | 2/2009 | Rofougaran |
| 2009/0073070 A1 | 3/2009 | Rofougaran |
| 2009/0075688 A1 | 3/2009 | Rofougaran |
| 2009/0086844 A1 | 4/2009 | Rofougaran |
| 2009/0091486 A1 | 4/2009 | Wiesbauer et al. |
| 2009/0094506 A1 | 4/2009 | Lakkis |
| 2009/0098826 A1 | 4/2009 | Zack et al. |
| 2009/0110131 A1 | 4/2009 | Bornhoft et al. |
| 2009/0111390 A1 | 4/2009 | Sutton et al. |
| 2009/0175323 A1 | 7/2009 | Chung |
| 2009/0180408 A1 | 7/2009 | Graybeal et al. |
| 2009/0218407 A1 | 9/2009 | Rofougaran |
| 2009/0218701 A1 | 9/2009 | Rofougaran |
| 2009/0236701 A1 | 9/2009 | Sun et al. |
| 2009/0237317 A1 | 9/2009 | Rofougaran |
| 2009/0239392 A1 | 9/2009 | Sumitomo et al. |
| 2009/0239483 A1 | 9/2009 | Rofougaran |
| 2009/0245808 A1 | 10/2009 | Rofougaran |
| 2009/0257445 A1 | 10/2009 | Chan et al. |
| 2009/0280765 A1 | 11/2009 | Rofougaran et al. |
| 2009/0310649 A1 | 12/2009 | Fisher et al. |
| 2010/0009627 A1 | 1/2010 | Huomo |
| 2010/0103045 A1 | 4/2010 | Liu et al. |
| 2010/0120406 A1 | 5/2010 | Banga et al. |
| 2010/0127804 A1 | 5/2010 | Vouloumanos |
| 2010/0149149 A1 | 6/2010 | Lawther |
| 2010/0159829 A1 | 6/2010 | McCormack |
| 2010/0167645 A1 | 7/2010 | Kawashimo |
| 2010/0202345 A1 | 8/2010 | Jing et al. |
| 2010/0202499 A1 | 8/2010 | Lee et al. |
| 2010/0203833 A1 | 8/2010 | Dorsey |
| 2010/0231452 A1 | 9/2010 | Babakhani et al. |
| 2010/0260274 A1 | 10/2010 | Yamada et al. |
| 2010/0265648 A1 | 10/2010 | Hirabayashi |
| 2010/0277394 A1 | 11/2010 | Haustein et al. |
| 2010/0282849 A1 | 11/2010 | Mair |
| 2010/0283700 A1 | 11/2010 | Rajanish et al. |
| 2010/0285634 A1 | 11/2010 | Rofougaran |
| 2010/0297954 A1 | 11/2010 | Rofougaran et al. |
| 2010/0315954 A1 | 12/2010 | Singh et al. |
| 2011/0009078 A1 | 1/2011 | Kawamura |
| 2011/0038282 A1 | 2/2011 | Mihota et al. |
| 2011/0044404 A1 | 2/2011 | Vromans |
| 2011/0047588 A1 | 2/2011 | Takeuchi et al. |
| 2011/0050446 A1 | 3/2011 | Anderson et al. |
| 2011/0084398 A1 | 4/2011 | Pilard et al. |
| 2011/0092212 A1 | 4/2011 | Kubota |
| 2011/0122932 A1 | 5/2011 | Lovberg |
| 2011/0127954 A1 | 6/2011 | Walley et al. |
| 2011/0181484 A1 | 7/2011 | Pettus et al. |
| 2011/0197237 A1 | 8/2011 | Turner |
| 2011/0207425 A1 | 8/2011 | Juntunen et al. |
| 2011/0221582 A1 | 9/2011 | Chuey et al. |
| 2011/0250928 A1 | 10/2011 | Schlub et al. |
| 2011/0285606 A1 | 11/2011 | De Graauw et al. |
| 2011/0286703 A1 | 11/2011 | Kishima et al. |
| 2011/0292972 A1 | 12/2011 | Budianu et al. |
| 2011/0311231 A1 | 12/2011 | Ridgway et al. |
| 2012/0009880 A1 | 1/2012 | Trainin et al. |
| 2012/0013499 A1 | 1/2012 | Hayata |
| 2012/0028582 A1 | 2/2012 | Tandy |
| 2012/0064664 A1 | 3/2012 | Yamazaki et al. |
| 2012/0069772 A1 | 3/2012 | Byrne et al. |
| 2012/0072620 A1 | 3/2012 | Jeong et al. |
| 2012/0082194 A1 | 4/2012 | Tam et al. |
| 2012/0083137 A1 | 4/2012 | Rohrbach et al. |
| 2012/0091799 A1 | 4/2012 | Rofougaran et al. |
| 2012/0110635 A1 | 5/2012 | Harvey et al. |
| 2012/0126794 A1 | 5/2012 | Jensen et al. |
| 2012/0139768 A1 | 6/2012 | Loeda et al. |
| 2012/0219039 A1 | 8/2012 | Feher |
| 2012/0249366 A1 | 10/2012 | Pozgay et al. |
| 2012/0263244 A1 | 10/2012 | Kyles et al. |
| 2012/0265596 A1 | 10/2012 | Mazed et al. |
| 2012/0286049 A1 | 11/2012 | McCormack et al. |
| 2012/0290760 A1 | 11/2012 | McCormack et al. |
| 2012/0295539 A1 | 11/2012 | McCormack et al. |
| 2012/0307932 A1* | 12/2012 | McCormack et al. ......... 375/295 |
| 2012/0319496 A1 | 12/2012 | McCormack et al. |
| 2012/0319890 A1 | 12/2012 | McCormack et al. |
| 2013/0070817 A1 | 3/2013 | McCormack et al. |
| 2013/0106673 A1 | 5/2013 | McCormack et al. |
| 2013/0109303 A1 | 5/2013 | McCormack et al. |
| 2013/0157477 A1 | 6/2013 | McCormack |
| 2013/0183903 A1 | 7/2013 | McCormack et al. |
| 2013/0196598 A1 | 8/2013 | McCormack et al. |
| 2013/0257670 A1 | 10/2013 | Sovero et al. |
| 2013/0278360 A1 | 10/2013 | Kim et al. |
| 2013/0316653 A1 | 11/2013 | Kyles et al. |
| 2014/0038521 A1 | 2/2014 | McCormack |
| 2014/0043208 A1 | 2/2014 | McCormack et al. |
| 2014/0266331 A1 | 9/2014 | Arora |
| 2015/0111496 A1 | 4/2015 | McCormack et al. |

FOREIGN PATENT DOCUMENTS

| | | |
|---|---|---|
| CN | 2313296 Y | 4/1999 |
| CN | 1781255 A | 5/2006 |
| CN | 101090179 A | 12/2007 |
| CN | 101496298 A | 7/2009 |
| CN | 201562854 U | 8/2010 |
| EP | 0152246 A2 | 8/1985 |
| EP | 0515187 A2 | 11/1992 |
| EP | 0789421 A2 | 8/1997 |
| EP | 0884799 A2 | 12/1998 |
| EP | 0896380 A2 | 2/1999 |
| EP | 0996189 A2 | 4/2000 |
| EP | 1041666 A1 | 10/2000 |
| EP | 1298809 A2 | 4/2003 |
| EP | 1357395 A1 | 10/2003 |
| EP | 1798867 A2 | 6/2007 |
| EP | 2106192 A2 | 9/2009 |
| EP | 2309608 A1 | 4/2011 |
| EP | 2328226 A1 | 6/2011 |
| EP | 2360923 A1 | 8/2011 |
| GB | 817349 | 7/1959 |
| GB | 2217114 | 10/1989 |
| JP | 52-72502 A | 6/1977 |
| JP | 5-236031 A | 9/1993 |
| JP | 5-327788 A | 12/1993 |
| JP | 07-006817 A | 1/1995 |
| JP | 9-83538 A | 3/1997 |
| JP | 10-13296 A | 1/1998 |
| JP | 2001-153963 A | 6/2001 |
| JP | 2001-326506 A | 11/2001 |
| JP | 2002-261514 A | 9/2002 |
| JP | 2002-265729 A | 9/2002 |
| JP | 2003209511 A | 7/2003 |
| JP | 2004-505505 A | 2/2004 |
| JP | 2005-117153 A | 4/2005 |
| JP | 2008-079241 | 4/2008 |
| JP | 2008-129919 A | 6/2008 |
| JP | 2008-250713 A | 10/2008 |
| JP | 2008 252566 A | 10/2008 |
| JP | 2009-231114 | 7/2009 |
| JP | 2009-239842 A | 10/2009 |
| JP | 2010-183055 A | 8/2010 |
| JP | 2010-531035 A | 9/2010 |
| JP | 2011-022640 A | 2/2011 |
| JP | 2011-41078 A | 2/2011 |
| JP | 2014-516221 | 7/2014 |
| WO | 97/32413 A1 | 9/1997 |
| WO | WO 2006/133108 A2 | 12/2006 |
| WO | WO 2009/113373 A1 | 9/2009 |
| WO | 2011/114737 A1 | 9/2011 |
| WO | 2011/114738 A1 | 9/2011 |
| WO | WO 2012/129426 A3 | 9/2012 |
| WO | WO 2012/154550 A1 | 11/2012 |
| WO | WO 2012/155135 A3 | 11/2012 |
| WO | 2012/174350 A1 | 12/2012 |
| WO | WO 2012/166922 A1 | 12/2012 |
| WO | WO 2013/006641 A3 | 1/2013 |
| WO | WO 2013/040396 A1 | 3/2013 |
| WO | 2013/059801 A1 | 4/2013 |

(56) References Cited

FOREIGN PATENT DOCUMENTS

| WO | 2013/059802 A1 | 4/2013 |
|---|---|---|
| WO | 2013/090625 A1 | 6/2013 |
| WO | 2013/131095 A2 | 9/2013 |
| WO | WO 2013/134444 A1 | 9/2013 |
| WO | WO 2014/026191 A1 | 2/2014 |

OTHER PUBLICATIONS

Vahle Electrification Systems, "CPS Contactless Power System", Catalog No. 9d/E, 2004, 12 pages.

ECMA International, "Standard ECMA-398: Close Proximity Electric Induction Wireless Communications", Internet citation, Jun. 1, 2011, pp. 1-99.

Jochen Helms, Authorized Officer, European Patent Office, "International Search Report" in connection with related PCT Patent Application No. PCT/US2013/059811, dated Dec. 2, 2013, 4 pages.

Jochen Helms, Authorized Officer, European Patent Office, "Written Opinion of the International Searching Authority" in connection with related PCT Patent Application No. PCT/US2013/059811, dated Dec. 2, 2013, 6 pages.

Bluetooth Audio Dongle Receiver 3.5mm Stereo, Feb. 8, 2013.

Bluetooth Headset, Jabra clipper, Jul. 28, 2010.

Chinese Office Action, Chinese Application No. 201280025060.8, Oct. 30, 2014, 8 pages (with concise explanation of relevance).

Chinese Second Office Action, Chinese Application No. 201280025060.8, Jun. 11, 2015, 8 pages.

Enumeration: How the Host Learns about Devices, Jan Axelson's Lakeview Research.

Future Technology Devices Interntional Limited (FTDI) "Technical Note TN_I 13 Simplified Description ofUSB Device Enumeration", Doc. Ref. No. FT_000180, Version 1.0, Issue Date Oct. 28, 2009, 19 pages.

Japanese Office Action, Japanese Patent Office, "Notice of Reasons for Rejection" in connection with related Japanese Patent Application No. 2014-501249, dated Jul. 22, 2014, 7 pages.

Japanese Office Action, Japanese Application No. 2014-513697, Jan. 20, 2015, 7 pages.

Japanese Office Action, Japanese Application No. 2014-519270, Mar. 9, 2015, 17 pages.

Japanese Office Action, Japanese Application No. 2014-547442, May 25, 2015, 7 pages.

Japanese Office Action, Japanese Application No. 2015-004839, Aug. 10, 2015, 12 pages.

Juntunen, E. A., "60 GHz CMOS Pico-Joule/Bit Oook Receiver Design for Multi-Gigabit Per Second Wireless Communications" thesis paper, Aug. 2008, 52 pages.

Korean Office Action, Korean Application No. 10-2013-7027865, Oct. 22, 2014, 12 pages.

Korean Office Action, Korean Application No. 10-2013-7027865, Apr. 13, 2015, 8 pages.

Li, X. et al., "Space-Time Transmissions for Wireless Secret-Key Agreement with Information-Theoretic Secrecy," IEEE, 2003, pp. 1-5.

Office of Engineering and Technology Federal Communications Commission, "Understanding the FCC Regulations for Low-Power, Non-Licensed Transmitters", OET Bulletin No. 63, Oct. 1993, 34 pages.

PCM510x 2VRMS DirectPath™, 112/106/IOOdB Audio Stereo DAC with 32-bit, 384kHz PCM Interface by Texas Instruments.

PCT International Search Report, PCT Patent Application No. PCT/US2013/027835, dated May 3, 2013, 4 pages.

PCT Written Opinion, PCT Patent Application No. PCT/US2013/027835, May 3, 2013, 8 pages.

PCT International Search Report, PCT Patent Application No. PCT/US2013/029469, Jun. 6, 2013, 5 pages.

PCT Written Opinion, PCT Patent Application No. PCT/US2013/029469, Jun. 6, 2013, 5 pages.

PCT International Search Report, PCT Patent Application No. PCT/US2013/023665, Jun. 20, 2013, 5 pages.

PCT Written Opinion, PCT Patent Application No. PCT/US2013/023665, Jun. 20, 2013, 10 pages.

PCT International Search Report, PCT Patent Application No. PCT/US2012/040214, Aug. 21, 2012, 3 pages.

PCT Written Opinion, PCT Patent Application No. PCT/US2012/040214, Aug. 21, 2012, 8 pages.

PCT International Search Report, PCT Patent Application No. PCT/US2012/042616, Oct. 1, 2012, 4 pages.

PCT Written Opinion, PCT Patent Application No. PCT/US2012/042616, Oct. 1, 2012, 10 pages.

PCT International Search Report, PCT Patent Application No. PCT/US2012/030166, Oct. 31, 2010, 6 pages.

PCT Written Opinion, PCT Patent Application No. PCT/US2012/030166, Oct. 31, 2010, 9 pages.

PCT International Search Report, PCT Patent Application No. PCT/US2012/055488, Dec. 13, 2012, 4 pages.

PCT Written Opinion, PCT Patent Application No. PCT/US2012/055488, Dec. 13, 2012, 8 pages.

PCT International Search Report, PCT Patent Application No. PCT/US2012/045444, Jan. 21, 2013, 7 pages.

PCT Written Opinion, PCT Patent Application No. PCT/US2012/045444, Jan. 21, 2013, 9 pages.

PCT International Search Report, PCT Patent Application No. PCT/US2012/037795, Jan. 21, 2013, 7 pages.

PCT Written Opinion, PCT Patent Application No. PCT/US2012/037795, Jan. 21, 2013, 12 pages.

PCT International Search Report, PCT Patent Application No. PCT/US2012/061345, Jan. 24, 2013, 4 pages.

PCT Written Opinion, PCT Patent Application No. PCT/US2012/061345, Jan. 24, 2013, 7 pages.

PCT International Search Report, PCT Patent Application No. PCT/US2012/061346, Jan. 24, 2013, 5 pages.

PCT Written Opinion, PCT Patent Application No. PCT/US2012/061346, Jan. 24, 2013, 9 pages.

PCT International Search Report, PCT Patent Application No. PCT/US2012/069576, May 2, 2013, 3 pages.

PCT Written Opinion, PCT Patent Application No. PCT/US2012/069576, May 2, 2013, 13 pages.

PCT International Search Report, PCT Patent Application No. PCT/US2013/028896, Sep. 26, 2013, 4 pages.

PCT Written Opinion, PCT Patent Application No. PCT/US2013/028896, Sep. 26, 2013, 4 pages.

PCT International Search Report, PCT Patent Application No. PCT/US2013/046631, Sep. 20, 2013, 4 pages.

PCT Written Opinion, PCT Patent Application No. PCT/US2013/046631, Sep. 20, 2013, 6 pages.

PCT International Search Report, PCT Patent Application No. PCT/US2013/054292, Nov. 29, 2013, 4 pages.

PCT Written Opinion, PCT Patent Application No. PCT/US2013/054292, Nov. 29, 2013, 7 pages.

PCT International Search Report and Written Opinion, PCT Application No. PCT/US2014/024027, Jul. 21, 2014, 15 pages.

PCT International Search Report, PCT Application No. PCT/US2013/075222, Jul. 17, 2014, 4 pages.

PCT Written Opinion, PCT Application No. PCT/US2013/075222, Jul. 17, 2014, 8 pages.

PCT International Search Report, PCT Application No. PCT/US2013/075892, Apr. 23, 2014, 4 pages.

PCT Written Opinion, PCT Application No. PCT/US2013/075892, Apr. 23, 2014, 8 pages.

PCT International Search Report and Written Opinion, PCT Application No. PCT/US2013/033394, Aug. 8, 2013, 10 pages.

PCT International Search Report and Written Opinion, PCT Application No. PCT/US2013/055487, Jan. 24, 2014, 9 pages.

PCT International Search Report and Written Opinion, PCT Application No. PCT/US2013/076687, May 21, 2014, 20 pages.

PCT International Search Report and Written Opinion, PCT Application No. PCT/US2014/030115, Sep. 22, 2014, 15 pages.

Philips, I2S Bus Specification, Jun. 5, 1996.

RF Power Amplifier, Mar. 22, 2008, 1 page, May be Retrieved at <http://en.wikipedia.org/wiki/RF_power_amplifier>.

Silicon Labs USB-to-12S Audio Bridge Chip Brings Plug-and-Play Simplicity to Audio Design, Cision Wire, Feb. 4, 2013.

(56) References Cited

OTHER PUBLICATIONS

TN21065L_I2S, Interfacing I2S-Compatible Audio Devices to the ADSP-21065L Serial Ports, Apr. 1999.
USB in a NutShell . . . (43 pages).
USB Made Simple, MQP Electronics Ltd, 2006-2008 (78 pages).
"Understanding the FCC Regulations for Low-Power Non-Licensed Transmitters", Office of Engineering and Technology, Federal Communications Commission, OET Bulletin No. 63, Oct. 1993.
Universal Serial Bus, Wikipedia, 2012 (32 pages).
Wireless HD: "WirelessHD Specification Version 1.1 Overview," May 1, 2010, pp. 1-95, May be retrieved from the Internet<URL:http://www.wirelesshd.org/pdfs/WirelessHD-Specification-Overview-v1.1May2010.pdf>.
United States Office Action, U.S. Appl. No. 13/485,306, Sep. 26, 2013, 11 pages.
United States Office Action, U.S. Appl. No. 13/541,543, Feb. 12, 2015, 25 pages.
United States Office Action, U.S. Appl. No. 13/541,543, Oct. 28, 2014, 42 pages.
United States Office Action, U.S. Appl. No. 13/427,576, Oct. 30, 2014, 6 pages.
United States Office Action, U.S. Appl. No. 13/524,956, Feb. 9, 2015, 17 pages.
United States Office Action, U.S. Appl. No. 13/524,963, Mar. 17, 2014, 14 pages.
United States Office Action, U.S. Appl. No. 13/657,482, Jan. 2, 2015, 29 pages.
United States Office Action, U.S. Appl. No. 12/655,041, Jun. 7, 2013, 9 pages.
United States Office Action, U.S. Appl. No. 14/047,924, Dec. 19, 2014, 8 pages.
United States Office Action, U.S. Appl. No. 14/047,924, Feb. 27, 2014, 9 pages.
United States Office Action, U.S. Appl. No. 13/784,396, Sep. 11, 2014, 7 pages.
United States Office Action, U.S. Appl. No. 13/760,089, Jul. 7, 2014, 14 pages.
United States Office Action, U.S. Appl. No. 14/596,172, Feb. 10, 2015, 7 pages.
United States Office Action, U.S. Appl. No. 14/462,560, Feb. 13, 2015, 12 pages.
United States Office Action, U.S. Appl. No. 14/135,458, Apr. 13, 2015, 13 pages.
United States Office Action, U.S. Appl. No. 13/541,543, May 28, 2015, 17 pages.
United States Office Action, U.S. Appl. No. 14/047,924, May 21, 2015, 6 pages.
United States Office Action, U.S. Appl. No. 13/922,062, Jul. 23, 2015, 10 pages.
United States Office Action, U.S. Appl. No. 13/963,199, Jul. 27, 2015, 9 pages.
United States Office Action, U.S. Appl. No. 14/109,938, Aug. 14, 2015, 12 pages.
Chinese First Office Action, Chinese Application 201280043190.4, Jan. 21, 2015, 18 pages.
Chinese Second Office Action, Chinese Application 201280043190.4, Oct. 26, 2015, 5 pages.
European Examination Report, European Application No. 13711499.7, Oct. 5, 2015, 8 pages.
Japanese Office Action, Japanese Application No. 2014-513697, Nov. 2, 2015, 5 pages.
United States Office Action, U.S. Appl. No. 13/657,482, Sep. 22, 2015, 24 pages.
United States Office Action, U.S. Appl. No. 14/215,069, Oct. 30, 2015, 15 pages.
United States Office Action, U.S. Appl. No. 14/047,924, Nov. 18, 2015, 7 pages.
Chinese First Office Action, Chinese Application No. 201280038180.1, Dec. 1, 2015, 16 pages.
Chinese Third Office Action, Chinese Application No. 201280025060.8, Dec. 28, 2015, 6 pages.
Chinese First Office Action, Chinese Application No. 201280062118.6, Jan. 5, 2016, 15 pages.
Chinese First Office Action, Chinese Application No. 201380055859.6, Jan. 20, 2016, 5 pages.
Chinese First Office Action, Chinese Application No. 201380048407.5, Feb. 3, 2016, 14 pages.
United States Office Action, U.S. Appl. No. 14/881,901, Dec. 17, 2015, 15 pages.
United States Office Action, U.S. Appl. No. 13/541,543, Dec. 21, 2015, 20 pages.

* cited by examiner

WIRELESS CONNECTIONS WITH VIRTUAL HYSTERESIS

CROSS-REFERENCE TO RELATED PATENTS AND APPLICATIONS

The present application claims the benefit under 35 U.S.C. §119(e) of the filing date of provisional application Ser. No. 61/701,310 for VIRTUAL PHYSICAL HYSTERESIS, filed Sep. 14, 2012, which is hereby incorporated by reference in its entirety for all purposes. U.S. patent application Ser. No. 13/427,576 for INTEGRATED CIRCUIT WITH ELECTROMAGNETIC COMMUNICATION is also incorporated by reference in its entirety for all purposes.

TECHNICAL FIELD

The present invention generally relates to devices, systems, and methods for EHF communications, and more particularly to establishing and terminating EHF electromagnetic connections.

BACKGROUND

Contact bounce, or chatter, is a rapid current switching or flickering that may occur upon the closure of a mechanical switch or relay. It may occur when the electrical contacts in the switch have sufficient resilience, or springiness, that when they are brought into contact with one another they may rebound slightly, almost as if bouncing, before a steady constant contact is established. The result is an initial rapid current oscillation instead of the expected instantaneous transition from zero to full current. An exemplary plot showing an example of contact bounce as exhibited by a mechanical switch is shown in FIG. 1.

Although they do not possess mechanical switches, contactless connectors such as those described in U.S. patent application Ser. No. 13/427,576 (hereby incorporated by reference) may also suffer from rapid initial changes in signal strength as the connectors are brought into sufficient proximity to establish the desired wireless connection. Variations in electromagnetic field homogeneity, small changes in relative antenna orientations, and other factors may all contribute to such observed signal variations, which may compromise the initial stability of the connection.

What is needed is a contactless circuit connector that can prevent or compensate for such initial variations in signal strength, so as to ensure that even at the initial stages of establishing a contactless connection, the connection is nevertheless both robust and consistent.

SUMMARY

In one embodiment, the present invention provides a circuit connector for communicating between devices, where the circuit connecter includes a receiver configured to receive a transmitted EHF electromagnetic signal, an output circuit coupled to the receiver and that is responsive to a control signal for outputting an output signal representative of the received signal when the control signal has a first state and for not outputting the output signal when the control signal has a second state, and a controller coupled to the receiver and configured to produce the control signal having the second state until a signal strength of the received signal exceeds a first threshold for a first time interval, whereupon the controller produces the control signal having the first state, and the controller is configured to produce the control signal with the second state when the signal strength of the received signal fails to meet a second threshold for a second time interval.

In another embodiment, the present invention provides a circuit connector for communicating between devices that includes an output circuit coupled to a receiver, where the output circuit is responsive to a control signal for outputting an output signal representative of a received signal when the control signal has a first state and for not outputting the output signal when the control signal has a second state. The circuit connector further includes a controller coupled to the receiver and configured to produce the control signal having the second state until a signal strength of the received signal exceeds a first threshold, whereupon the controller produces the control signal having the first state, and to produce the control signal with the second state when the signal strength of the received signal fails to meet a second threshold for a second time interval.

In yet another embodiment, the present invention provides a method for establishing an electronic signal using a circuit connector configured to communicate via EHF electromagnetic signals. The method includes receiving an EHF electromagnetic signal at the circuit connector, converting the received EHF electromagnetic signal to a received electronic signal having a received electronic signal level, detecting a signal representative of the received electronic signal level, comparing the detected signal to a threshold signal representative of a first signal strength threshold, initiating a first timer when the detected signal exceeds the threshold signal, measuring a first time interval during which the detected signal exceeds the threshold signal, outputting a first timer output signal when the detected signal exceeds the first signal strength threshold for the first time interval, outputting the received electronic signal in response to the first timer output signal, comparing the detected signal to a second threshold signal representative of a second signal strength threshold; initiating a second timer if the detected signal fails to meet the second threshold signal; measuring a second time interval during which the detected signal fails to meet the second threshold signal; outputting a second timer output signal when the detected signal fails to meet the second threshold signal for a second time interval; and preventing an output of the received electronic signal in response to the second timer output signal.

In yet another embodiment, the present invention provides a method for establishing an electronic signal using a circuit connector device configured to communicate via EHF electromagnetic signals. The method includes receiving an EHF electromagnetic signal at the circuit connector, converting the received EHF electromagnetic signal to a received electronic signal having a received electronic signal level, detecting a signal representative of the received electronic signal level, comparing the detected signal to a threshold signal representative of a first signal strength threshold; measuring the amount of time the detected signal exceeds the first threshold signal, outputting a first output signal when the detected signal exceeds the first threshold signal for a first time interval, and outputting the received electronic signal in response to the first output signal.

DESCRIPTION OF PREFERRED EMBODIMENTS

Conventional physical connections between devices or circuits exhibit a variety of detrimental characteristics when employed in electronic systems that are designed to transfer data at very high rates, resulting in degradation of signal integrity and a corresponding system instability. Physical connections may be eliminated by using wireless communication systems, such as are disclosed in U.S. Pat. No. 5,621,913 and U.S. patent application Ser. No. 12/655,041 (the disclosures of these and all other publications referenced herein are incorporated by reference in their entirety for all purposes).

However, such wireless systems are not able to accommodate the ever-increasing demands of high-bandwidth modular and portable memory devices. In order to ensure security and stability of communication between and within these devices, Extremely High Frequency (EHF) communications units may be utilized in a variety of new and useful applications.

An EHF communications unit may include one or more EHF communications chip package, or EHF comm-link chip. Examples of such comm-link chips are described in detail in U.S. Provisional Patent Application Ser. Nos. 61/491,811, 61/467,334, 61/485,1103, and 61/485,543, hereby incorporated by reference in their entireties for all purposes.

Figure 1:
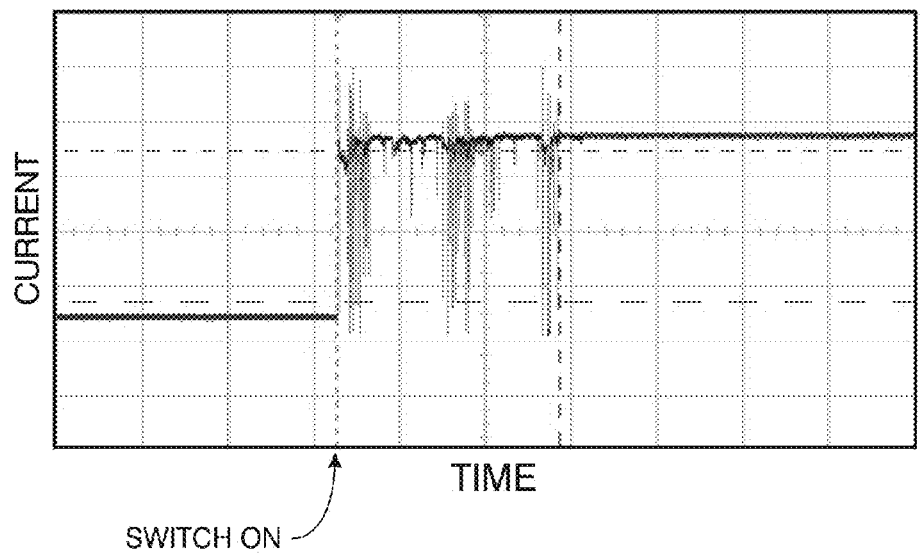
FIG. 1 is a plot illustrating contact bounce when closing a mechanical switch.
Figure 2:
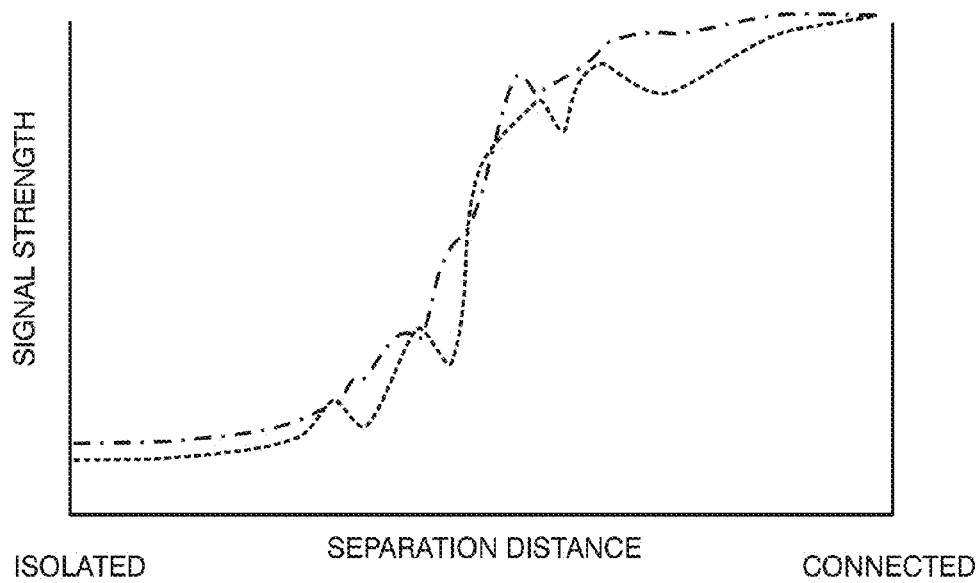
FIG. 2 is a representative plot of signal strength between contactless connection components as a function of separation distance, with the dashed line depicting variability in signal strength as a contactless connection is formed, and with the dot-dashed line depicting variability in signal strength as a contactless connection is terminated. Equal and constant rate of change of separation distance is assumed for both plots.

As shown in FIG. 2, in such EHF communication systems, two EHF comm-link chips must be brought to a certain proximity before the strength of the EHF signal between the comm-link chips is sufficient to establish a stable communication link. As shown in FIG. 2, as the separation distance between two EHF communication components is decreased, signal strength can increases unevenly. Similarly, as the two components are separated, the signal strength decreases unevenly. As a result, the communication system may attempt to create an initial connection only to have it terminate one or more times before becoming established. Similarly, as the components are separated, the connection may terminate, but then immediately attempt to reestablish itself as signal strength increases temporarily.

In order to minimize the impact of such variation in signal strength during the initiation or termination of a contactless EHF connection, each communication package may apply a virtual hysteresis effect during connection and disconnection. A system exhibits hysteresis when the behavior of that system depends not only on its current condition, but also on its immediately previous condition. That is, the behavior of the system during a transition from state A to state B is different than its behavior during a transition from state B to state A. Hysteresis is sometimes described as the lagging of an effect behind its cause.

The imposition of a virtual (or artificial) hysteresis effect on such contactless connections would require that a signal received by a connectors must be stronger than a defined minimum signal strength, and exhibit a required degree of stability, before the receiving connector establishes an EHF connection. Conversely, the receiving connector would not terminate the EHF connection between the two connectors until and unless the strength of the received signal dropped below a defined minimum signal strength for a minimum time interval.

Figure 3:
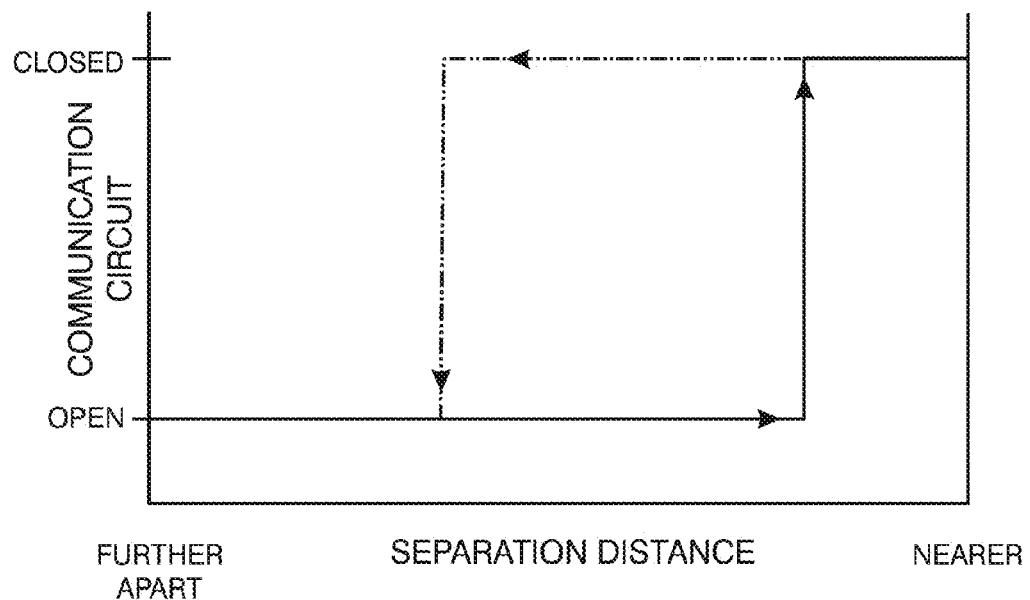
FIG. 3 is a representative plot showing the hysteresis exhibited while establishing and terminating a contactless communication circuit according to an embodiment of the present invention.

Once a virtual hysteresis effect has been imposed, when the two exemplary EHF comm-link chips are brought into proximity, a communication link would not be established until the EHF signal received by the receiving comm-link chip exhibits sufficient strength and/or sufficient strength for a predefined duration. Similarly, as the EHF comm-link chips are separated, the communication link would not be terminated until the EHF signal received by the receiving comm-link dropped below a predefined signal strength. As shown in FIG. 3, this would result in the communication circuit between the comm-link chips to exhibit hysteresis as the communication link is first established, and subsequently terminated.

Figure 4:
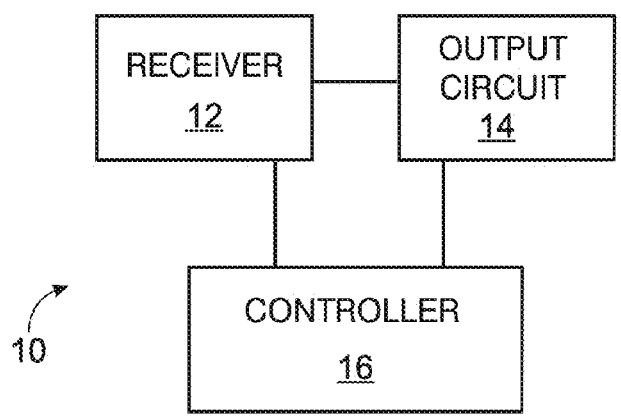
FIG. 4 is a block diagram depicting an exemplary circuit connector according to an embodiment of the present invention.

FIG. 4 is a block diagram showing an illustrative circuit connector 10 according to an embodiment of the present invention. Circuit connector 10 may be capable of implementing a virtual hysteresis loop. The circuit connector 10 includes a receiver 12 configured to receive a transmitted EHF electromagnetic signal; an output circuit 14 coupled to the receiver 12, where the output circuit has two states of operation that correspond to enabling a signal output and disabling the signal output. The circuit connector further includes a controller 16 coupled to the receiver 12 and configured to produce a control signal having two states corresponding to a first condition when the received signal exceeds a first threshold and a second condition when the received signal is less than a second threshold. Output circuit 14 is configured to change its state of operation responsive to a state of a control signal.

Alternatively, or in addition, the output circuit 14 of circuit connector 10 may be configured to be responsive to the control signal for outputting an output signal representative of the received signal when the control signal has a first state, and for not outputting the output signal when the control signal has a second state. In this embodiment, the controller is configured to produce the control signal having the second state until a signal strength of the received signal exceeds a first threshold for a first time interval, whereupon the controller produces the control signal having the first state.

Figure 5:
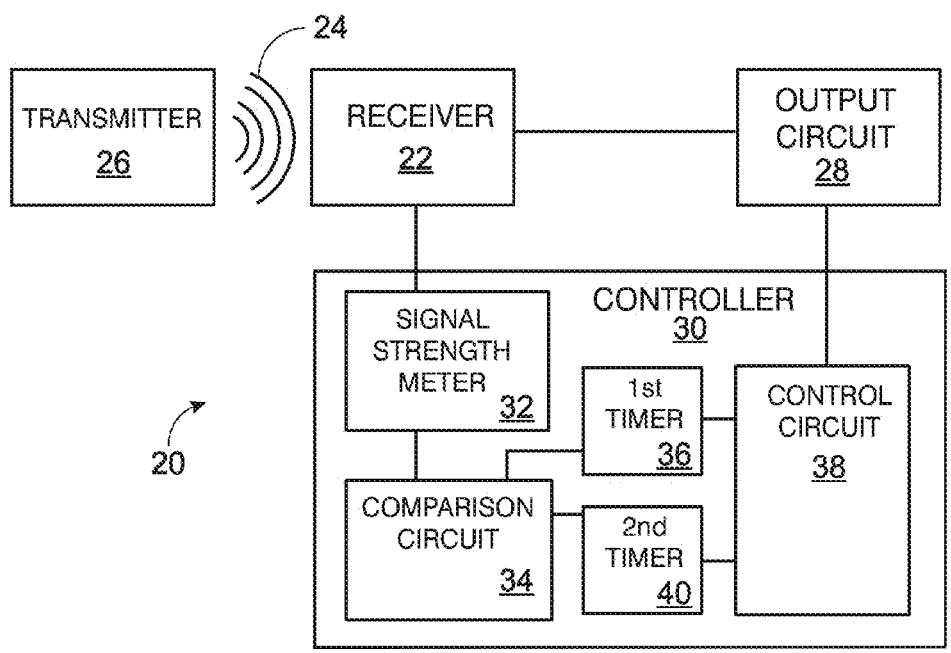
FIG. 5 is a block diagram depicting an alternative circuit connector according to an embodiment of the present invention.

FIG. 5 is a block diagram showing an illustrative circuit connector 20 according to an alternative embodiment of the present invention, that may also be capable of implementing a virtual hysteresis loop. Similar to circuit connector 10 of FIG. 4, The circuit connector 20 includes a receiver 22 configured to receive a transmitted EHF electromagnetic signal 24 from a nearby EHF transmitter 26, which may be another EHF circuit connector that may be the same or different than device 20. Receiver 22 may be configured to convert the received modulated EHF electromagnetic signal 24 to a received electronic signal having a received electronic signal level.

Circuit connector 20 may further include an output circuit 28 coupled to the receiver 22, where the output circuit 28 is responsive to a control signal for enabling a signal output representative of the received signal when the control signal has a first state and for disabling the signal output when the control signal has a second state.

Also coupled to the receiver 22 is a controller 30. Generally, controller 30 is configured to configured to send a control signal having the second state to the output circuit 28, preventing the output circuit from enabling signal output until a signal strength of the received signal exceeds a first threshold for a first time interval, at which point the controller 30 sends a control signal having the first state to the output circuit 28, which responds by enabling a signal output.

Controller 30 may further include a signal strength meter 32 that may be coupled to the receiver 22, that may be configured to determine a detected signal representative of the electronic signal level received by the receiver 22. The signal strength meter 32 may be further coupled to a comparison circuit 34 that is configured to compare the detected signal to a threshold signal representative of a first signal strength threshold, and produce a timer control signal indicative of whether or not the detected signal exceeds the threshold signal.

Comparison circuit 34, in turn, may be coupled to a first timer 36, that is configured to receive the timer control signal produced by the comparison circuit 34, and measure a first time interval during which the detected signal exceeds the threshold signal, and output a timer output signal to a control circuit 38. The control circuit 38 is coupled to both the first timer 36 and to the output circuit 28, and the control circuit 38 is configured to produce the control signal appropriate for triggering the output circuit 28 to output the received electronic signal in response to the first timer output signal. That is, if the first timer output signal is received by the control circuit 38 from the first timer 36, the detected signal strength has exceeded the threshold signal for the first time interval, and the communication link may therefore be established.

In some embodiments of the invention, the control circuit 38 may include a rate circuit that is configured to calculate a rate of change of the received electronic signal level. By determining the rate of change of the strength of a received electronic signal, the control circuit may determine the difference between the time a signal reaches a lower threshold and the time the signal reaches an upper threshold. A physical device typically always exhibit a rate of closure when establishing a contactless connection, and so if control circuit 38 determines that the lag between the time a signal reaches a lower threshold and the time the signal reaches an upper threshold is less than a predefined reference value, the control circuit may then disable communication of the received electronic signal.

Additionally, circuit connector 20 may further include a second timer 40. In this embodiment, the output circuit 28 may be configured to prevent the output of the received electronic signal upon receiving a second control signal from control circuit 38. The comparison circuit 34 may also be additionally configured to compare the detected signal to a second threshold signal representative of a second signal strength threshold, and produce a second timer control signal indicative of whether or not the detected signal fails to meet the second threshold signal. Second timer 40 may be further configured to receive the second timer control signal and measure a second time interval during which the detected signal fails to meet the second threshold signal, and output a second timer output signal to the control circuit 38 that may be representative of whether the detected signal has failed to meet the second threshold signal for the second time interval. In this embodiment of the invention, the control circuit is response to the second timer output signal for producing a second control signal appropriate for preventing the output of the received electronic signal by the output circuit 28 after the detected signal has failed to meet the second threshold for the second time interval. In one embodiment of the invention, the first and second signal strength thresholds are the same, and/or the first and second time intervals are the same.

Figure 6:
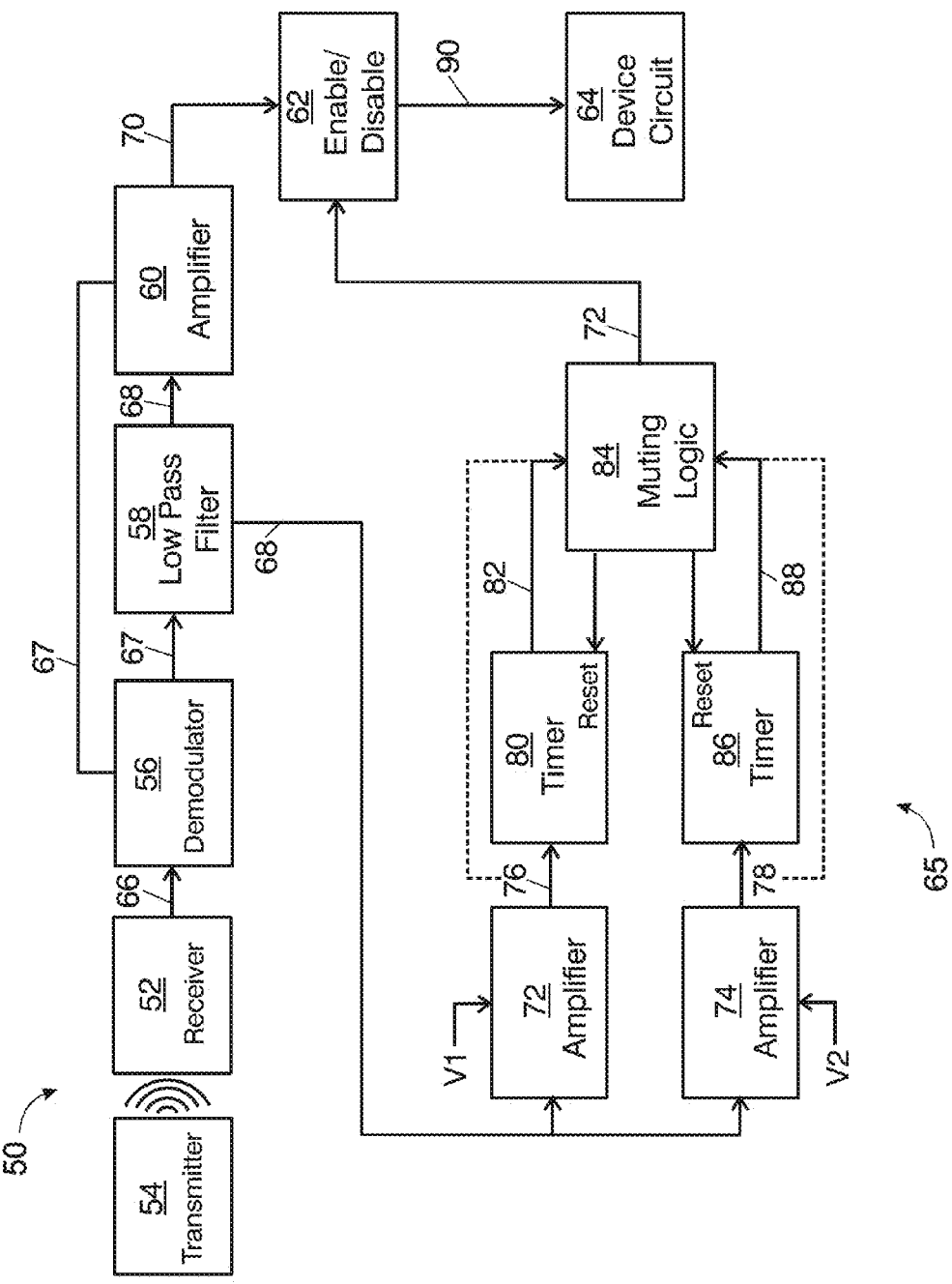
FIG. 6 is a block diagram showing an exemplary system for implementing a virtual hysteresis response, according to an embodiment of the present invention.

FIG. 6 is a block diagram showing an illustrative system for implementing a virtual hysteresis loop in an electronic circuit, generally indicated at 50. Circuit 50 may include a receiver 52 in communication with a transmitter 54 and electrically connected to a demodulator 56, a low pass filter (LPF) 58 and an amplifier 60, both electrically connected to demodulator 56, an enabling circuit 62 disposed electrically between amplifier 60 and a device circuit 64, and a hysteresis logic circuit generally indicated at 65 electrically connected to both LPF 58 and enabling circuit 62.

Receiver 52 may be any suitable circuit configured to receive a modulated electromagnetic (EM) signal having an EHF frequency, convert the received signal to an electronic signal, and amplify the signal. The EM signal may be generated by transmitter 54, which may be located on the same or another device, and/or be in motion relative to the receiver. In some examples, receiver 52 may include an IC package having an embedded antenna and an amplifier. An amplified electronic signal 66 may be communicated to demodulator 56. Demodulator 56 may be any suitable demodulator component or circuit configured to demodulate signal 66 and to communicate a demodulated signal 67 to both LPF 58 and amplifier 60. LPF 58 may be any suitable structure or circuit configured to filter demodulated signal 67 and to generate an averaged signal 68 proportional to the strength of the received signal.

Amplifier 60 may be any suitable component or structure configured to generate a clean output data signal 70. For example, amplifier 60 may be a comparator configured to compare demodulated signal 67 and averaged signal 68, and to provide an output data signal 70 that is high when demodulated signal 67 is above averaged signal 68 and low otherwise.

Enable circuit 62 may be any suitable circuit or component configured to selectively block or unblock the connection of output data signal 70 to device circuit 64. For example, enable circuit 62 may open and close a switch in response to a control signal 72 from hysteresis logic circuit 65.

Hysteresis logic circuit 65 may include multiple amplifiers each receiving two inputs, one of the inputs being averaged signal 68 and the other being a reference level. Each amplifier may also communicate an output to a respective timer, and the outputs of the amplifiers and/or the timers may be used to logically determine the desired state of enable circuit 62.

For example, hysteresis logic circuit 65 may include first amplifier 72 and second amplifier 74. First amplifier 72 may be a comparator that receives inputs V1 and averaged signal 68, may compare the two inputs, and may have an output 76 that is high when signal 68 is greater than level V1. Second amplifier 74 may be a comparator that receives inputs V2 and averaged signal 68, may compare the two inputs, and may have an output 78 that is high when input signal 68 is less than level V2.

Signal 76, in turn, may be provided as an input to a first timer 80 and may initiate first timer 80 when signal 76 is high. Timer 80 may be any suitable component or circuit configured to saturate or terminate at a predetermined amount of time after initiation, and may provide an output 82 that may be high when timer 80 has saturated. Timer output 82 may be provided to a muting logic circuit 84. Amplifier output 76 may also be provided to muting logic circuit 84.

Similarly, output signal 68 may be provided to a second timer 86 and may initiate second timer 86 when signal 78 is high. As described above, second timer 86 may time out and provide an output 88 to muting logic circuit 84, and muting logic circuit 84 may provide a reset input to first timer 80. In similar fashion, muting logic circuit 84 may provide a reset input to second timer 86. Amplifier output 78 may also be provided to the muting logic circuit 84.

Muting logic circuit 84 may be any suitable component or circuit configured to receive multiple inputs, determine a preferred state of enable circuit 62 based on those inputs, and provide controlling signal 90 to enable circuit 64. For example, muting logic circuit 84 may cause enable circuit 62 to block data signal 70 from reaching device circuit 64 in response to a timed-out signal 88 from second timer 86.

Figure 7:
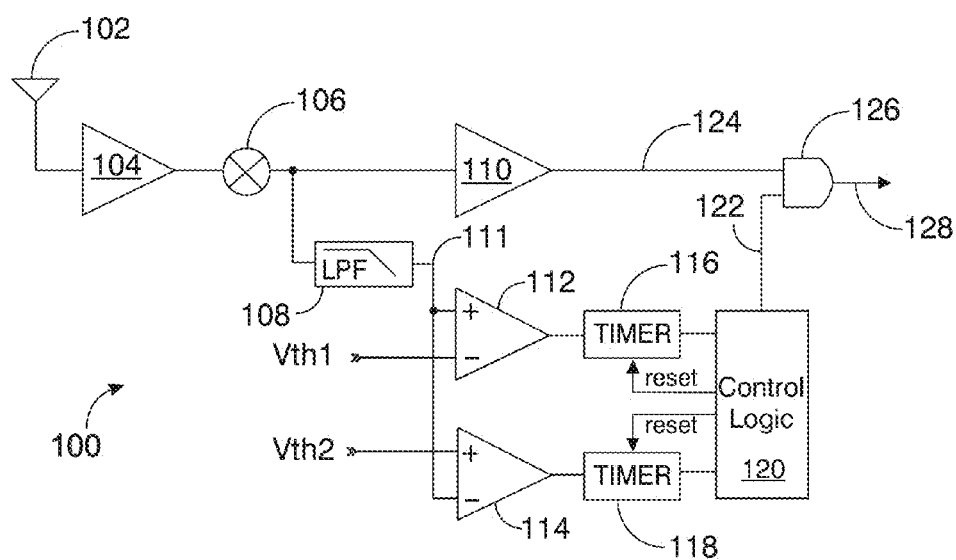
FIG. 7 is an electronic circuit schematic diagram depicting an exemplary circuit for implementing a virtual hysteresis response, according to an embodiment of the present invention.

Turning to FIG. 7, an example of a circuit 50 is depicted and generally indicated at 100. Circuit 100 may include an antenna 102 electrically connected to a amplifier 104, which in turn is connected to a demodulator 106 that is in communication with an LPF 108 and a comparator 110. An output 111 of LPF 108 is also provided to comparators 112 and 114, which are wired in parallel with each other, and in series with respective timers 116 and 118. The outputs of first timer 116 and second timer 118 may be provided to control circuit 120, and an output 122 of control circuit 120 may be provided, along with an output 124 of comparator 110, to a logic AND gate 126.

In this example, as in the description above regarding circuit 50, a received signal is processed through antenna 102, amplifier 104, and demodulator 106 and filtered by LPF 108. A baseband data signal 124 is generated by running the received signal (and possibly a filtered signal 111) through comparator 110 or any other suitable component or circuit. In this example, filtered signal 111 is compared to a first threshold voltage Vth(1) by comparator 112 and to a second threshold voltage Vth(2) by comparator 114, where the first threshold voltage and second threshold voltage may be the same or different. As shown in FIG. 7, Vth(1) may be provided to a negative input of comparator 112, and Vth(2) may be provided to a positive input of comparator 114, with signal 111 on the remaining respective inputs. Accordingly, comparator 112 will provide a high output and start first timer 116 when signal 111 is greater than Vth(1), and comparator 114 will provide a high output and start second timer 118 when signal 111 is less than Vth(2).

Timers 116 and 118 each may have user-selectable timer settings and may time out, or saturate, at different durations. Upon saturation, an output of each timer may go high. Because each timer output is communicated to control circuit 120, an output 122 of control circuit 120 may be changed depending on the state of each timer. For example, output 122 may be high when first timer 116 is saturated and second timer 118 is not saturated, and may be low when second timer 118 is saturated and first timer 116 is not saturated. Furthermore, the outputs of timers 116 and 118, or signals based on a state of those outputs, may each be used by control circuit 120 to reset the other timer. This may be done, for example, to ensure that both timers are not simultaneously in a saturated state. In some examples, logic circuit 120 may reset either or both timers based on these or other criteria.

In some examples, timer 116 and/or timer 118 may begin timing upon receiving a high output signal from a respective comparator, and may continue timing out only as long as the high signal is received, resetting to zero if a terminal count is not reached. This method may be referred to as "episodic" in that it keeps track of time above or below a threshold for that particular episode or excursion above or below. In other examples, timer 116 and/or timer 118 may begin incrementing upon receipt of a high signal from a respective comparator, but may then decrement upon receipt of a low signal from the comparator. In these examples, timing may only include positive values, meaning a timer may not go negative but may instead stop at a zero, or reset condition. Accordingly, in these examples, the timer or timers may reflect a cumulative time above or below a threshold value over several episodes, rather than a single episode above or below a threshold value.

Because AND gate 126 requires that both signal 124 and signal 122 be present before providing an output 128, control circuit 120 and AND gate 126 may provide the functions of muting circuit 72 and enable circuit 62 as previously described.

Figure 8:
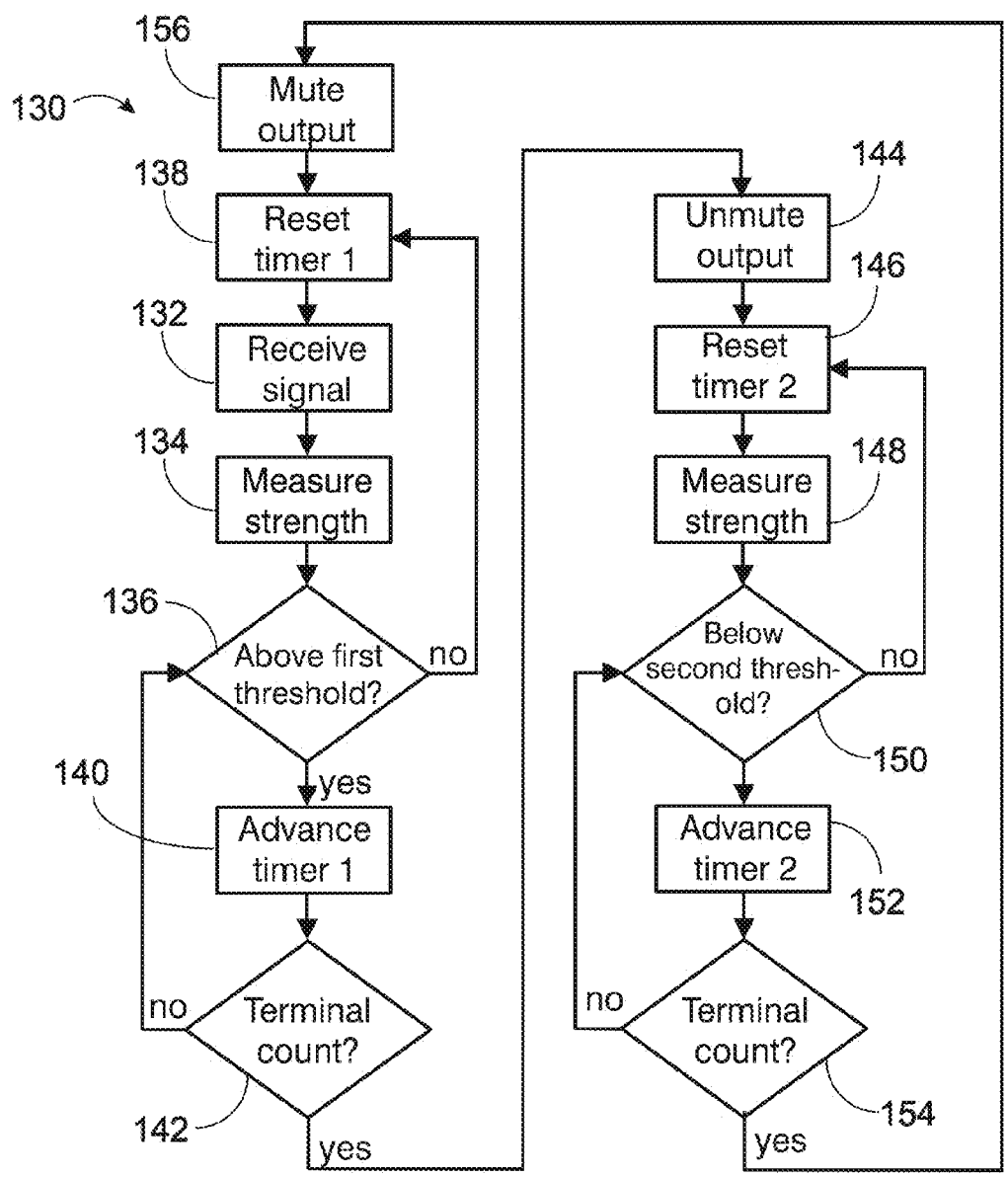
FIG. 8 is a flowchart depicting an exemplary sequence of events when implementing a virtual hysteresis response, according to an embodiment of the present invention.

Turning to FIG. 8, a flow chart 130 is provided showing an illustrative sequence of events when using a representative circuit such as circuit 100, including episodic timers as described above. In this example, beginning at reference numeral 132, a signal may be received and its strength measured at 134. If that measured strength is less than a first threshold as determined at 136, a first timer is reset at 138, and the measuring and monitoring of the received signal continues at 132 and 134. If the measured strength is greater than the first threshold, a first timer is advanced at 140. If, after advancing the first timer, the first timer reaches a terminal count (i.e., times out) at 142, an output of the circuit is unmuted at 144. As described above, this output may be the baseband data signal of a received signal. In this example, a second timer B may be reset at 146 simultaneously or sequentially with the unmuting of the output signal.

Once the output signal has been unmuted, the received signal strength continues to be measured at 148. If the signal strength is at or above the second threshold, the second timer B is reset at 146, but if the signal strength falls below the second threshold level at 150, the second timer is advanced at 152. If the second timer reaches its terminal count (i.e., times out) at 154, the output is then muted at 156 and the first timer may be simultaneously reset in preparation for the signal strength again possibly rising above the first threshold. As is shown by flowchart 130, this process of measuring signal strength over time may be an ongoing process, continuing ad infinitum.

Figure 9:
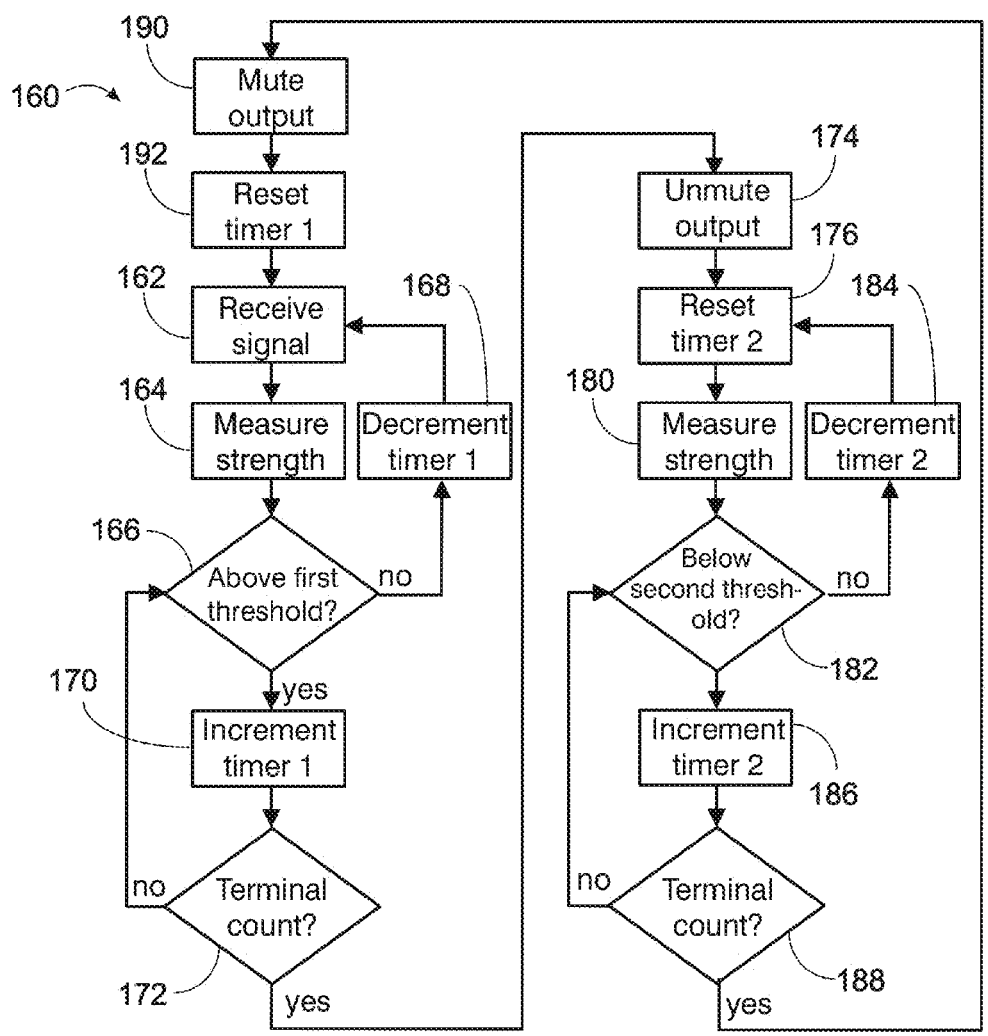
FIG. 9 is a flowchart depicting an alternative exemplary sequence of events when implementing a virtual hysteresis response, according to an alternative embodiment of the present invention.

FIG. 9 provides a flowchart 160 that shows an illustrative sequence of events when using a circuit such as representative circuit 100, this time with incrementing and decrementing timers as described above. Beginning at reference numeral 162, a signal may be received and its strength measured at 164. If that measured strength is less than a first threshold, as determined at 166, a first timer is decremented at 168 and measuring and monitoring of the received signal continues at 162. If the first timer is decremented until it reaches zero, it will not be decremented further. In other words decrementing will not continue below the reset value. If the measured strength is greater than the first threshold, as determined at 166, the first timer is incremented at 170. If by incrementing the first time, the timer reaches a terminal count (i.e., times out) at 172, an output of the circuit is unmuted at 174. In this example, a second timer may be reset at 176 simultaneously or sequentially with the unmuting of the output signal.

The unmuted signal is received at 178 and continues to be measured at 180. If the signal strength is above a certain second threshold level as determined at 182, the second timer is decremented at 184. Similar to the first timer, the second timer will not be decremented below a zero or reset value. Alternatively, if the received signal strength is below the second threshold, the second timer will be incremented at 186. If the second timer reaches its terminal count (i.e., times out) at 188, the output is then muted at 190 and the first timer may be simultaneously or sequentially reset at 192 in preparation for the signal strength again possibly rising above the first threshold. Similar to the flowchart 130 of FIG. 8, this sequence of operations may continue indefinitely.

Figure 10:
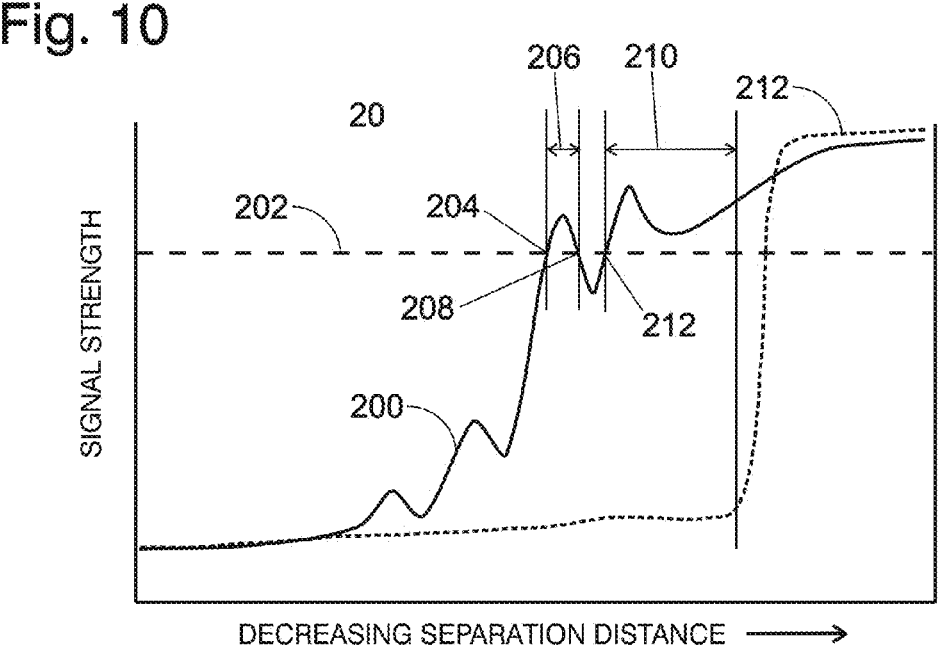
FIG. 10 is a plot depicting the effect of an applied virtual hysteresis on signal strength during the formation of a contactless connection, according to an embodiment of the present invention.

FIG. 10 illustrates how a hysteresis circuit, such as exemplary circuit 100 may respond to a received EHF electromagnetic signal that is intermittently increasing as the separation distance between the components of the connection is steadily decreased. Although the details of FIG. 10 are representative and exemplary, the signal strength between a transmitter and receiver is generally inversely proportional to the separation distance between them. Line 200 represents the signal strength of a received signal. Signal strength 200 increases until the strength of the signal reaches a first threshold 202 at point 204. The hysteresis circuit then begins incrementing a first timer and continues to monitor the signal strength. After a time interval 206 the signal strength falls below threshold 202 at point 208. Since the time interval 206 is less than a preselected minimum required duration 210, the first timer is reset.

Signal strength 200 then increases again and at point 212 the signal strength passes threshold level 202 and the hysteresis circuit begins incrementing the first timer. Thereafter, signal strength 200 remains continuously above the minimum signal level 202 until the first timer reaches its terminal count, resulting in time interval 210, and the received signal is unmuted and a connection is established, as indicated by line 214 which depicts the state of the connection.

Figure 11:
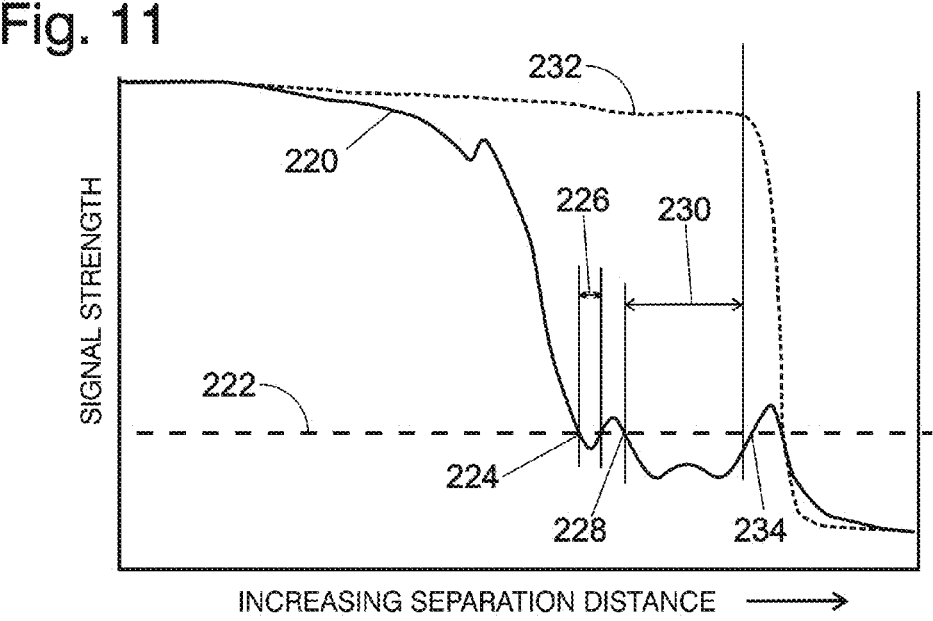
FIG. 11 is a plot depicting the effect of an applied virtual hysteresis on signal strength during the termination of a contactless connection, according to an embodiment of the present invention.

Conversely, FIG. 11 illustrates how the hysteresis circuit 100 would respond to a connected EHF electromagnetic signal that is decreasing as the separation distance between the components of the connection is steadily increased. Line 220 represents the signal strength of a received signal. Signal strength 220 decreases until the strength of the signal drops below a second threshold 222 at point 224. The hysteresis circuit then begins incrementing a second timer and continues to monitor the signal strength. After a time interval 226 the signal strength rises above threshold 222 at point 228. Since the time interval 226 is less than a preselected minimum duration, the second timer is reset.

Signal strength 220 then begins to decrease again and at point 228 the signal strength again drops below threshold level 222. Thereafter, signal strength 220 remains continuously below the minimum signal level 222 until the second timer reaches its terminal count after time interval 230, and the received signal is muted and the connection is terminated, as indicated by line 232 which depicts the state of the connection. Although signal strength 220 again increases above threshold level 222 at 234, the second timer has been reset and this has no effect.

Considering the examples provided in FIGS. 8 and 9, FIGS. 10 and 11 may depict the end result of the application of a hysteresis circuit such as circuit 100 by the components of a contactless EHF connection. As shown, line 212 of FIG. 10 depicts the formation of the contactless connection as the separation distance between the two components of the connection is decreased. Because of the effect of the hysteresis circuit, the connection is not established until the signal strength between the two components is both strong and stable. Line 232 of FIG. 11 depicts the termination of the contactless connection as the separation distance between the two components of the connection is increased. Again, due to the effect of the applied virtual hysteresis, the connection is not terminated until signal strength is consistently lower than desirable. The occurrence of transient connections thereafter is prevented, because the signal strength must increase to the first threshold before the first timer is even activated.

Figure 12:
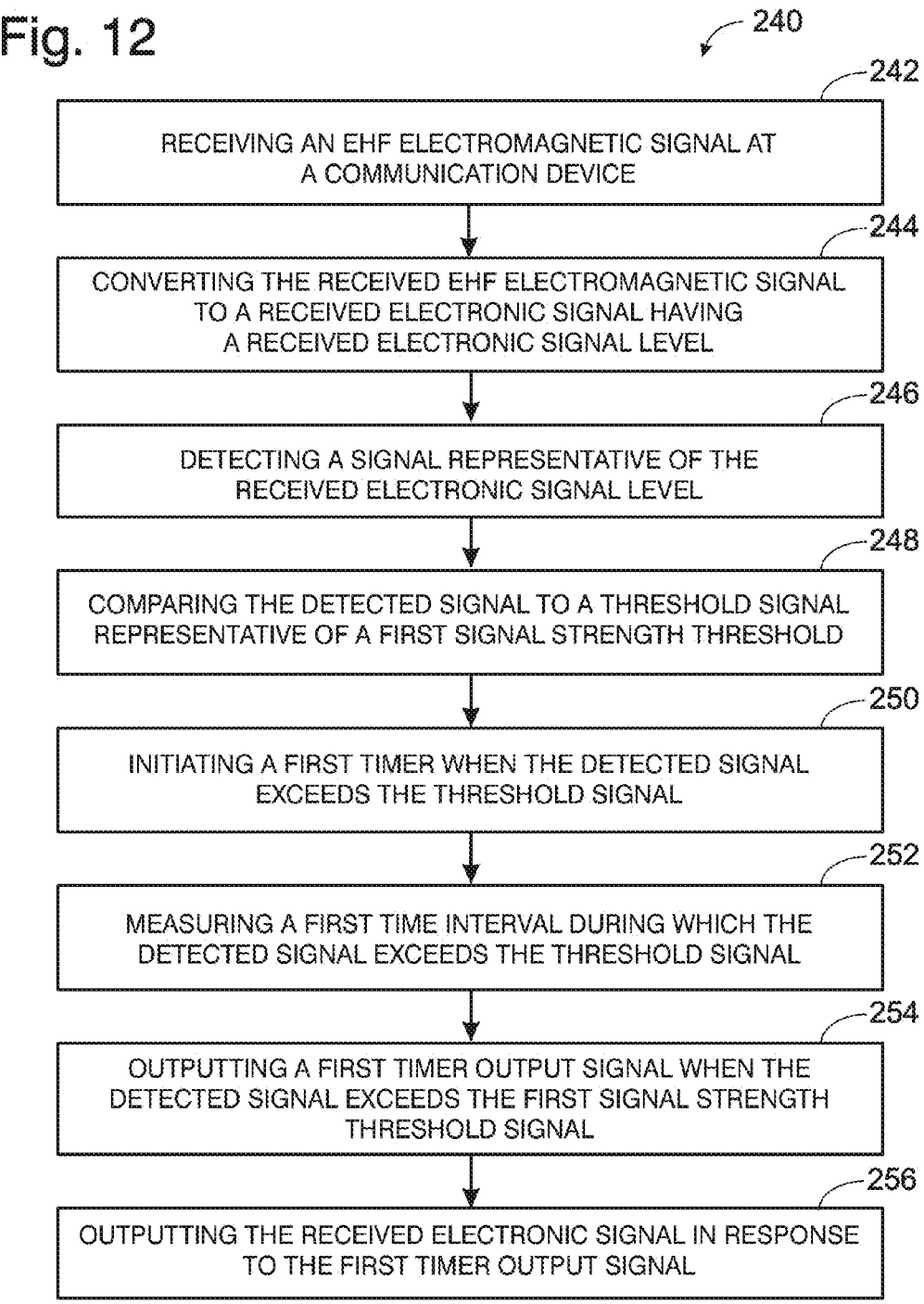
FIG. 12 is a flowchart illustrating an exemplary method according to an embodiment of the present invention.

In one embodiment of the invention, the devices and systems of the present invention lend themselves to a method for establishing an electronic signal using a circuit connector configured to communicate via EHF electromagnetic signals, as depicted in flowchart 240 of FIG. 12. The exemplary method includes receiving an EHF electromagnetic signal at the circuit connector at 242; converting the received EHF electromagnetic signal to a received electronic signal having a received electronic signal level at 244; detecting a signal representative of the received electronic signal level at 246; comparing the detected signal to a threshold signal representative of a first signal strength threshold at 248; initiating a first timer when the detected signal exceeds the threshold signal at 250; measuring a first time interval during which the detected signal exceeds the threshold signal at 252; outputting a first timer output signal when the detected signal exceeds the first signal strength threshold for the first time interval at 254; and outputting the received electronic signal in response to the first timer output signal at 256.

Figure 13:
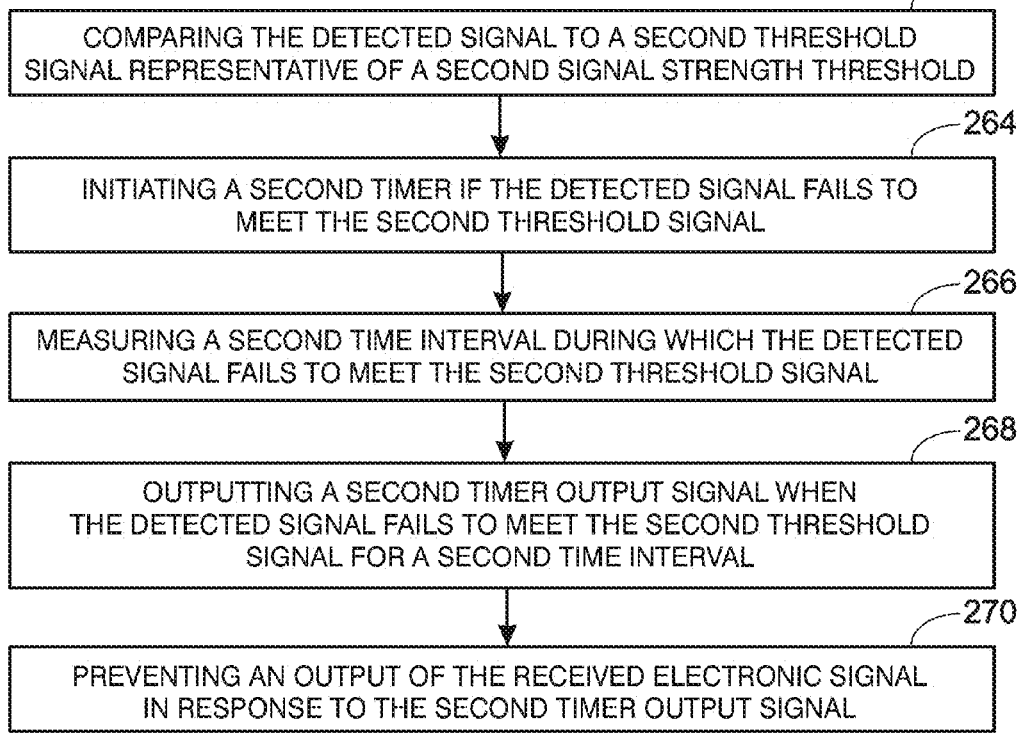
FIG. 13 is a flowchart illustrating an optional extension of the flowchart of FIG. 12.

In addition, the method of flowchart 240 may optionally further include the additional elements set out at flowchart 260 of FIG. 13. Flowchart 260 includes comparing the detected signal to a second threshold signal representative of a second signal strength threshold at 262; initiating a second timer if the detected signal fails to meet the second threshold signal at 264; measuring a second time interval during which the detected signal fails to meet the second threshold signal at 266; outputting a second timer output signal when the detected signal fails to meet the second threshold signal for a second time interval at 268; and preventing an output of the received electronic signal in response to the second timer output signal at 270.

Figure 14:
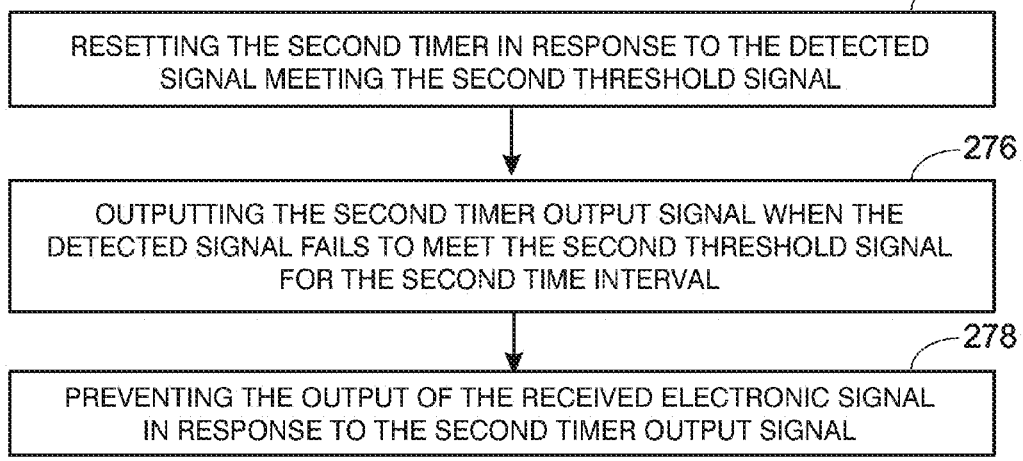
FIG. 14 is a flowchart illustrating an optional extension of the flowchart of FIG. 13.

Alternatively, the method of flowchart 240 may optionally further include the additional elements set out at flowchart 272 of FIG. 14. Flowchart 272 includes resetting the second timer in response to the detected signal meeting the second threshold signal at 274; outputting the second timer output signal when the detected signal fails to meet the second threshold signal for the second time interval at 276; and preventing the output of the received electronic signal in response to the second timer output signal at 278.

Figure 15:
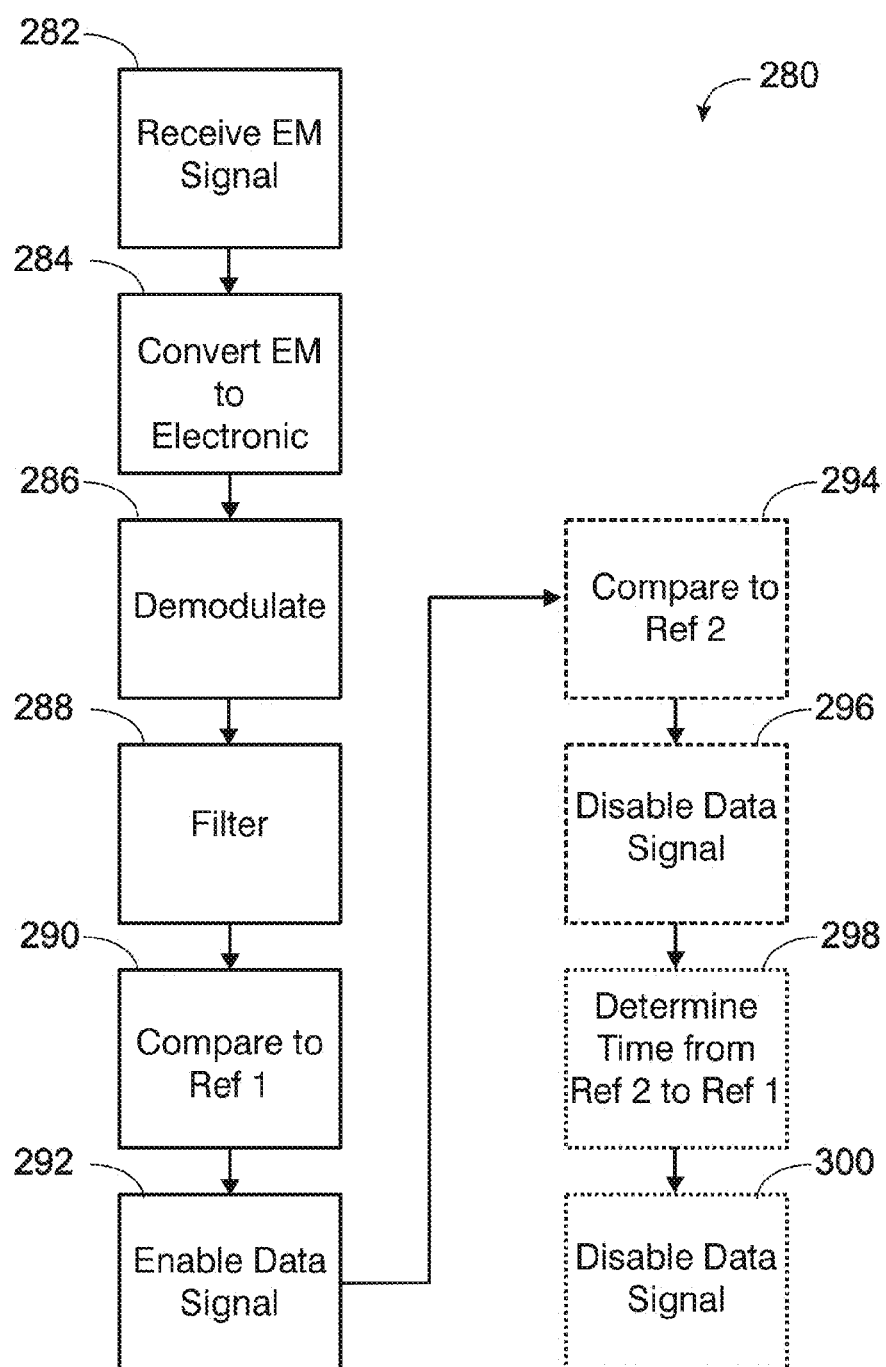
FIG. 15 is a block diagram showing another exemplary system for implementing a virtual hysteresis response, according to an embodiment of the present invention.

In yet another embodiment of the invention, the devices and systems of the present invention lend themselves to a method for establishing a contactless EHF electromagnetic connection between a first and second device configured to communicate via EHF electromagnetic signals. FIG. 15 depicts a block diagram 280 depicting another exemplary method for implementing a hysteresis function in an electronic circuit. The method may include receiving a modulated electromagnetic (EM) signal at 282; converting the EM signal to a received electronic signal at 284; demodulating the received electronic signal at 286, passing the received electronic signal through a low pass filter to generate an averaged signal proportional to a signal strength of the received electronic signal at 288; comparing the averaged signal to a first reference at 290; and enabling communication of the received electronic signal to a device circuit in response to the averaged signal remaining above the first reference for a first amount of time at 292.

The method of block diagram 280 may optionally further include comparing the averaged signal to a second reference at 294; and disabling communication of the received electronic signal to the device circuit in response to the averaged signal remaining below the second reference for a second amount of time at 296.

In some aspects of the present invention, it may be desirable to determine a speed at which a received signal is changing strength. For example, such a determination may be desirable as a security method to ensure that electronic spoofing is not occurring. As physical devices have some real rate of closure when establishing a contactless connection, there should be a measurable difference between the time a signal reaches a lower threshold and the time the signal reaches an upper threshold. The method of block diagram 280 may further include determining a duration between a time the averaged signal reaches the second reference and a time the averaged signal reaches the first reference at 298; and disabling communication of the received electronic signal in response to the duration being less than a third reference at 300.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

What is claimed is:

1. A first contactless connector included in a first device for communicating with a second contactless connector included in a second device using extremely high frequency (EHF) signals, the first contactless connector comprising:
   a receiver configured to receive a transmitted EHF electromagnetic signal from the second contactless connector;
   an output circuit coupled to receive the transmitted EHF signal from an output of the receiver, the output circuit configured to:
      output the transmitted EHF signal when a control signal has a first state and configured to not output the transmitted EHF signal when the control signal has a second state; and
   a controller coupled to the receiver and configured to:
      determine a signal strength of the transmitted EHF signal;
      produce the control signal having the second state until the determined signal strength of the transmitted EHF signal exceeds a first threshold for a first time interval, whereupon the controller produces the control signal having the first state to enable the output circuit to output the transmitted EHF signal from the receiver; and thereafter
      produce the control signal with the second state to disable the output circuit from outputting the transmitted EHF signal from the receiver when the determined signal strength of the transmitted EHF signal fails to meet a second threshold for a second time interval.

2. The first contactless connector of claim 1, wherein the first and second thresholds are the same, and the first and second time intervals are the same.

3. The first contactless connector of claim 1, wherein the first threshold is greater than the second threshold.

4. The first contactless connector of claim 1, wherein
   the receiver is configured to receive a modulated EHF electromagnetic signal and convert the received modulated EHF electromagnetic signal to a received electronic signal having a received electronic signal level; and
   the controller includes
      a signal strength meter configured to determine a detected signal representative of the received electronic signal level;
      a comparison circuit, configured to compare the detected signal to a threshold signal representative of a first signal strength threshold, and produce a timer control signal indicative of whether or not the detected signal exceeds the threshold signal;
      a first timer configured to receive the timer control signal and measure a first time interval during which the detected signal exceeds the threshold signal, and output a timer output signal representative of whether the detected signal has exceeded the threshold signal for the first time interval; and
      a control circuit responsive to the first timer output signal for producing the control signal appropriate for outputting the received electronic signal after the detect signal has exceeded the threshold for the first time interval.

5. The first contactless connector of claim 4, wherein the controller is configured to reset the first timer if the received electronic signal level drops below the first signal strength threshold during the first time interval.

6. The first contactless connector of claim 4, wherein
   the output circuit is further configured to prevent output of the received electronic signal in response to a second control signal;
   the comparison circuit is further configured to compare the detected signal to a second threshold signal representative of a second signal strength threshold, and produce a second timer control signal indicative of whether or not the detected signal fails to meet the second threshold signal;

the second timer is further configured to receive the second timer control signal and measure a second time interval during which the detected signal fails to meet the second threshold signal, and output a second timer output signal representative of whether the detected signal has failed to meet the second threshold signal for the second time interval; and the control circuit is responsive to the second timer output signal for producing a second control signal appropriate for preventing the output of the received electronic signal after the detected signal has failed to meet the second threshold for the second time interval.

7. The first contactless connector of claim 6, wherein the timer is configured to reset the second time interval when the first timer reaches the end of the first time interval.

8. The first contactless connector of claim 7, wherein the timer is configured to reset the first time interval when the timer reaches the end of the second time interval.

9. The first contactless connector of claim 4, wherein the first signal strength threshold and the first time interval are user-selectable.

10. The first contactless connector of claim 4, wherein the control circuit further comprises a rate circuit configured to calculate a rate of change of the received electronic signal level.

11. The first contactless connector of claim 4, wherein the receiver includes an integrated circuit package having an antenna embedded in the package and configured to receive the transmitted EHF electromagnetic signal.

12. A first contactless connector included in a first device for communicating with a second contactless connector included in a second device using extremely high frequency (EHF) signals, the first contactless connector comprising:

an output circuit coupled to an output of a receiver, the output circuit configured to:
output a transmitted EHF signal received by the receiver when a control signal has a first state and configured to not output the transmitted EHF signal received by the receiver when the control signal has a second state; and a controller coupled to the receiver and configured to:
determine a signal strength of the transmitted EHF signal;
produce the control signal having the second state until the determined signal strength of the transmitted EHF signal exceeds a first threshold for a first time interval, whereupon the controller produces the control signal having the first state to enable the output circuit to output the transmitted EHF signal from the receiver; and thereafter
produce the control signal with the second state to disable the output circuit from outputting the transmitted EHF signal from the receiver when the determined signal strength of the transmitted EHF signal fails to meet a second threshold for a second time interval.

13. The first contactless connector of claim 12, wherein the first threshold is greater than the second threshold.

14. A method for controlling an electronic signal using a first contactless connector included in a first device configured to communicate with a second contactless connector included in a second device via extremely high frequency (EHF) electromagnetic signals, the method comprising:

receiving a transmitted EHF electromagnetic signal from the second contactless connector at the first contactless connector;

determining a signal strength of the transmitted EHF signal;

comparing the determined signal strength to a first signal strength threshold;

initiating a first timer when the determined signal strength exceeds the first signal strength threshold;

measuring a first time interval during which the determined signal strength exceeds the first signal strength threshold;

outputting a first timer output signal when the determined signal strength exceeds the first signal strength threshold for the first time interval;

enabling an output circuit to output the transmitted EHF signal from a receiver included in the first contactless connector in response to the first timer output signal;

comparing the determined signal strength to a second signal strength threshold;

initiating a second timer if the determined signal strength fails to meet the second signal strength threshold;

measuring a second time interval during which the determined signal strength fails to meet the second signal strength threshold;

outputting a second timer output signal when the determined signal strength fails to meet the second signal strength threshold for the second time interval; and disabling the output circuit to output the transmitted EHF signal from the receiver included in the first contactless connector in response to the second timer output signal.

15. The method of claim 14, further comprising:
resetting the second timer in response to the determined signal strength meeting the second threshold signal after initiating the second timer and before measuring a second time interval equal to or greater than the second time interval.

16. The method of claim 14, wherein the second signal strength threshold is lower than the first signal strength threshold.

17. The method of claim 14, wherein receiving the transmitted EHF electromagnetic signal at the first contactless connector includes receiving the transmitted EHF electromagnetic signal from the second contactless connector configured to communicate via EHF electromagnetic signals; further comprising establishing a communications link between the second contactless connector and the first contactless connector in response to the first timer output signal.

18. The method of claim 14, wherein receiving the transmitted EHF electromagnetic signal at the first contactless connector includes receiving the transmitted EHF electromagnetic signal from the second contactless connector configured to communicate via EHF electromagnetic signals; further comprising terminating a communication link between the second contactless connector and the first contactless connector in response to the second timer output signal.

19. A method for establishing a communication link between a first contactless connector included in a first device and a second contactless connector included in a second device using extremely high frequency (EHF) electromagnetic signals, the method comprising:

receiving, by a receiver, a transmitted EHF signal from the second contactless connector at the first contactless connector;

determining a signal strength of the transmitted EHF signal;

comparing the determined signal strength to a first signal strength threshold;

measuring an amount of time the determined signal strength exceeds the first signal strength threshold;

outputting a first output signal when the determined signal strength exceeds the first signal strength threshold for a first time interval; and enabling an output circuit to output the transmitted EHF signal from the receiver included in the first contactless connector in response to the first output signal.

20. The method of claim 19, further comprising:

comparing the determined signal strength to a second signal strength threshold;

measuring the amount of time the determined signal strength fails to meet the second threshold signal;

outputting a second output signal when the determined signal strength fails to meet the second threshold signal for a second time interval; and disabling the output circuit to output the transmitted EHF signal from the receiver included in the first contactless connector in response to the second output signal.

21. The method of claim 20, wherein the second signal strength threshold is lower than the first signal strength threshold.

* * * * *